US008428435B2

(12) United States Patent
Yamamoto et al.

(10) Patent No.: US 8,428,435 B2
(45) **Date of Patent: *Apr. 23, 2013**

(54) CONTENT USE DEVICE AND RECORDING MEDIUM

(75) Inventors: Masaya Yamamoto, Osaka (JP); Toshihisa Nakano, Osaka (JP); Ryuichi Okamoto, Osaka (JP); Motoji Ohmori, Osaka (JP)

(73) Assignee: Panasonic Corporation, Osaka (JP)

( * ) Notice: Subject to any disclaimer, the term of this patent is extended or adjusted under 35 U.S.C. 154(b) by 387 days.

This patent is subject to a terminal disclaimer.

(21) Appl. No.: 12/796,077

(22) Filed: Jun. 8, 2010

(65) Prior Publication Data

US 2010/0247077 A1 Sep. 30, 2010

Related U.S. Application Data

(62) Division of application No. 10/590,712, filed as application No. PCT/JP2005/003829 on Mar. 1, 2005, now Pat. No. 7,760,988.

(30) Foreign Application Priority Data

Mar. 9, 2004 (JP) ................................ 2004-066183

(51) Int. Cl.
*H04N 9/80* (2006.01)

(52) U.S. Cl.
USPC ......................................................... 386/252

(58) Field of Classification Search ........................ None
See application file for complete search history.

(56) References Cited

U.S. PATENT DOCUMENTS

| | | | | |
|---|---|---|---|---|
| 5,813,010 | A | 9/1998 | Kurano et al. | |
| 5,884,004 | A | 3/1999 | Sato et al. | |
| 5,915,067 | A | 6/1999 | Nonomura et al. | |
| 6,009,433 | A | 12/1999 | Kurano et al. | |
| 6,704,491 | B1 | 3/2004 | Revis | |
| 7,146,498 | B1 | 12/2006 | Takechi et al. | |
| 7,760,988 | B2 * | 7/2010 | Yamamoto et al. | 386/244 |

FOREIGN PATENT DOCUMENTS

| | | |
|---|---|---|
| EP | 0 737 974 | 10/1996 |
| EP | 0 788 105 | 8/1997 |
| EP | 0 801 384 | 10/1997 |
| EP | 0 830 023 | 3/1998 |
| JP | 2857120 | 8/1997 |
| JP | 10-336568 | 12/1998 |
| JP | 2002-222581 | 8/2002 |

OTHER PUBLICATIONS

International Search Report issued Sep. 19, 2005 in International Application No. PCT/JP2005/003829.

* cited by examiner

*Primary Examiner* — Huy T Nguyen
(74) *Attorney, Agent, or Firm* — Wenderoth, Lind & Ponack, L.L.P.

(57) ABSTRACT

To provide a content playback device that can use content appropriately by avoiding output of content not permitted to be used according to contract information. A playback control unit 102 extracts a content name from playback control information in a playback path information table 210, and inquires of a rights management unit 108 whether content identified by the extracted content name is playable or not. If the content is judged as being unplayable, the playback control unit 102 extracts an alternative playback number from the playback control information, and extracts a content name from playback control information whose playback number matches the alternative playback number. The playback control unit 102 then instructs a decryption unit 103 and a playback unit 107 to decrypt and play back encrypted content identified by the extracted content name.

12 Claims, 21 Drawing Sheets

FIG.3

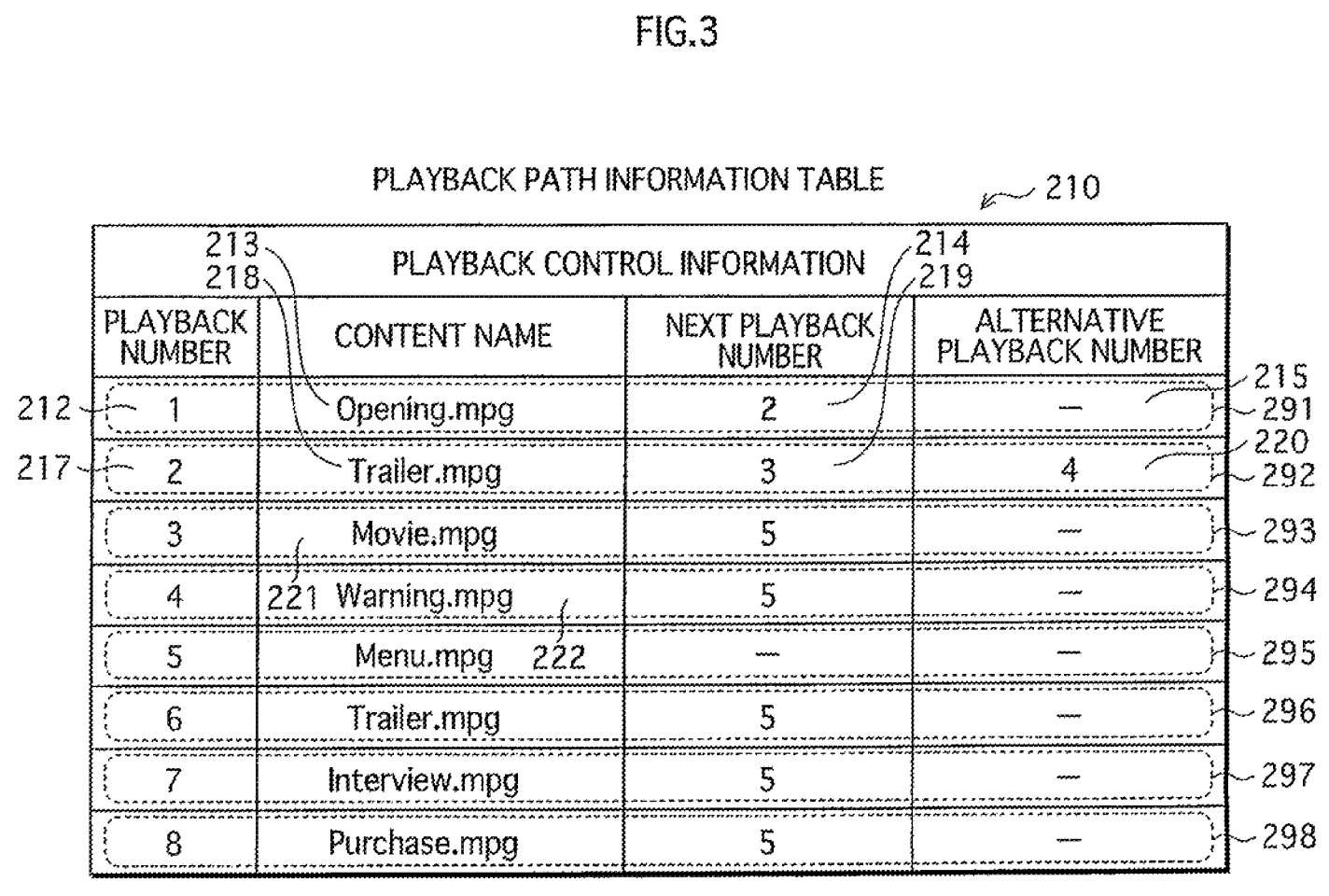

PLAYBACK PATH INFORMATION TABLE 210

| PLAYBACK NUMBER | PLAYBACK CONTROL INFORMATION | | |
|---|---|---|---|
| | CONTENT NAME | NEXT PLAYBACK NUMBER | ALTERNATIVE PLAYBACK NUMBER |
| 1 | Opening.mpg | 2 | — |
| 2 | Trailer.mpg | 3 | 4 |
| 3 | Movie.mpg | 5 | — |
| 4 | Warning.mpg | 5 | — |
| 5 | Menu.mpg | — | — |
| 6 | Trailer.mpg | 5 | — |
| 7 | Interview.mpg | 5 | — |
| 8 | Purchase.mpg | 5 | — |

FIG.5

BUTTON DATA TABLE

240

| BUTTON DATA | | | | | | | | |
|---|---|---|---|---|---|---|---|---|
| BUTTON NUMBER | PLAYBACK NUMBER | UPPER BUTTON NUMBER | LOWER BUTTON NUMBER | LEFT BUTTON NUMBER | RIGHT BUTTON NUMBER | UN-SELECTED DATA | SELECTED DATA | GRAYED-OUT DATA |
| 1 | 2 | 4 | 2 | 4 | 2 | PLAY | PLAY | PLAY |
| 2 | 3 | 1 | 3 | 1 | 3 | PLAY | PLAY | PLAY |
| 3 | 8 | 2 | 4 | 2 | 4 | PURCHASE | PURCHASE | — |
| 4 | 7 | 3 | 1 | 3 | 1 | PLAY | PLAY | PLAY |

KEY CONTROL INFORMATION TABLE 260

| | KEY CONTROL INFORMATION | | | | |
|---|---|---|---|---|---|
| CONTENT NAME | CONTENT INFORMATION (262) | KEY GENERATION INFORMATION (263) | PLAYABILITY INFORMATION (264) | COPYABILITY INFORMATION (265) | RIGHTS MODE INFORMATION (270) |
| Opening.mpg (261) | 1111 | 00 (MEDIA KEY) | 1 (PLAYABLE) | 01 (Once) | 00 (—) (266) |
| Trailer.mpg | 2222 | 00 (MEDIA KEY) | 1 (PLAYABLE) | 10 (Free) | 00 (—) |
| Movie.mpg | 3333 | 01 (COMPOSITE KEY) | 0 (UNPLAYABLE) | 00 (Never) | 01 (MODE A) (272) |
| Warning.mpg | 4444 | 00 (MEDIA KEY) | 1 (PLAYABLE) | 00 (Never) | 00 (—) |
| Menu.mpg | 5555 | 00 (MEDIA KEY) | 1 (PLAYABLE) | 00 (Never) | 00 (—) |
| Making.mpg | 6666 | 10 (RIGHTS KEY) | 0 (UNPLAYABLE) | 00 (Never) | 01,10 (MODES A AND B) (273) |
| Interview.mpg | 7777 | 10 (RIGHTS KEY) | 0 (UNPLAYABLE) | 00 (Never) | 10 (MODE B) (274) |

MEDIA INFORMATION TABLE

280

| MEDIA INFORMATION | |
|---|---|
| DEVICE INFORMATION | ENCRYPTED MEDIA KEY |
| 0001 | qwerty |
| 0002 | asdfgh |
| 0004 | zxcvbn |
| 0005 | uiop@[ |
| 0006 | jkl;:] |
| 0007 | m,./¥¥ |
| ⋮ | ⋮ |

RIGHTS INFORMATION TABLE

121

| RIGHTS INFORMATION | | | | |
|---|---|---|---|---|
| RIGHTS MODE INFORMATION | CONTENT NAME | RIGHTS KEY | PLAYBACK COUNT | PLAYBACK EXPIRATION DATE |
| 01 (MODE A) | Movie.mpg | qwerty | 2 | — |
| 01 (MODE A) | Making.mpg | asdfgh | 3 | — |
| 10 (MODE B) | Making.mpg | asdfgh | — | ~31/3/2004 |
| : | : | : | : | : |

122 123 124 125 126 127 128 129 130 131 132 133

CONTENT USE DEVICE AND RECORDING MEDIUM

This application is a divisional of application Ser. No. 10/590,712, filed Aug. 25, 2006 now U.S. Pat. No. 7,760,988 which is the National Stage of International Application No. PCT/JP2005/003829, filed Mar. 1, 2005.

TECHNICAL FIELD

The present invention relates to a content use device capable of protecting a copyrighted work, and a recording medium on which a copyrighted work is recorded.

BACKGROUND ART

Recording media, e.g. DVDs, on which copyrighted works such as movies and music are recorded in digital form, are widely used in recent years.

The DVD standard employs playback path control based on navigation data. According to this technique, a playback path of content can be specified using navigation data. Also, the playback path can be interactively altered by the user through a remote control (see Japanese Patent Application Publication No. H10-336568).

Meanwhile, a content delivery system that uses DRM (Digital Rights Management) is becoming common in recent years. According to DRM, a license is provided separately from encrypted content. The license contains a license key and a use condition. The encrypted content is decrypted using the license key and the decrypted content is played back, based on the use condition.

Consider a case where DRM is used in playback path control over a DVD on which a movie is recorded. A playback device selects content through playback path control, and checks a use condition of the content. Here, suppose the use of the content is not permitted under the use condition. If the playback device plays the content despite the use condition, the copyright of the content is violated. If the playback device does not play the content in compliance with the use condition, on the other hand, part of the scenes of the movie will end up being missing because a preset playback path is deviated. This causes ambiguity or contradiction in the story of the movie, thereby confusing the viewer.

DISCLOSURE OF THE INVENTION

To solve the above problem, the present invention aims to provide a content use device, a content use method, and a computer program that can appropriately use composite content including a plurality of pieces of content recorded on a recording medium, by avoiding output of unusable content according to contract information. The present invention also aims to provide a recording medium on which composite content is recorded.

The stated aim can be achieved by a content use device for using composite content recorded on a recording medium, the composite content including a plurality of pieces of content, the content use device including: an acquisition unit operable to acquire a designation of one of the plurality of pieces of content; a judgment unit operable to judge whether the designated piece of content is usable, based on contract information relating to use of the designated piece of content; a selection unit operable to select one of the plurality of pieces of content, according to a result of the judgment by the judgment unit; and an output unit operable to output the selected piece of content.

According to this construction, the content to be output next is selected depending on the usability of the designated content. In this way, the output of unusable content can be avoided. This enables the user to use content appropriately without confusion.

Here, the selection unit may select the designated piece of content if the designated piece of content is judged as being usable, and select an alternative piece of content instead of the designated piece of content if the designated piece of content is judged as being not usable, the alternative piece of content being included in the composite content in correspondence with the designated piece of content.

According to this construction, the composite content includes the alternative content to be output instead of the designated content if the designated content is unusable. This makes it possible to select the alternative content reliably.

Here, the composite content recorded on the recording medium may include a content identifier for identifying the designated piece of content and an alternative content identifier for identifying the alternative piece of content, in correspondence with each other, wherein the selection unit selects the designated piece of content by extracting the content identifier from the composite content if the designated piece of content is judged as being usable, and selects the alternative piece of content by extracting the alternative content identifier corresponding to the content identifier from the composite content if the designated piece of content is judged as being not usable, and the output unit reads the piece of content identified by the extracted content identifier or alternative content identifier from the recording medium, and outputs the read piece of content.

According to this construction, the alternative content can be selected reliably using the alternative content identifier.

Here, the judgment unit may acquire the contract information, and judge whether the designated piece of content is usable based on the acquired contract information.

According to this construction, the usability of the designated content is judged with reference to the acquired contract information. This enables content to be used properly without violating its copyright.

Here, the composite content recorded on the recording medium may include a license identifier for identifying the contract information, wherein the judgment unit includes: a contract information storage unit operable to prestore the license identifier and the contract information in correspondence with each other; an identifier extraction unit operable to extract the license identifier from the composite content; and a judging unit operable to read the contract information corresponding to the extracted license identifier from the contract information storage unit, and judge whether the designated piece of content is usable based on the read contract information.

Here, the composite content recorded on the recording medium may include a content identifier for identifying the designated piece of content and a license identifier for identifying the contract information, in correspondence with each other, wherein the judgment unit includes: a contract information storage unit operable to prestore the license identifier and the contract information in correspondence with each other; an identifier extraction unit operable to extract the license identifier corresponding to the content identifier for identifying the designated piece of content, from the composite content; and a judging unit operable to read the contract information corresponding to the extracted license identifier from the contract information storage unit, and judge whether the designated piece of content is usable based on the read contract information.

Here, the composite content recorded on the recording medium may include a content identifier for identifying the designated piece of content, wherein the judgment unit includes: a contract information storage unit operable to prestore the content identifier and the contract information in correspondence with each other; an identifier extraction unit operable to extract the content identifier from the composite content; and a judging unit operable to read the contract information corresponding to the extracted content identifier from the contract information storage unit, and judge whether the designated piece of content is usable based on the read contract information.

According to these constructions, the contract information corresponding to the designated content can be acquired reliably.

Here, the composite content recorded on the recording medium may include playback path information showing a correspondence between the designated piece of content and a preceding piece of content that is to be output immediately before the designated piece of content, wherein after the output unit outputs the preceding piece of content, the acquisition unit extracts the playback path information from the composite content, and acquires the designation in accordance with the extracted playback path information.

According to this construction, the output of unusable content can be avoided in playback path control.

Here, the plurality of pieces of content may include a plurality of pieces of angle content that are used for multi-angle switching, wherein the acquisition unit acquires the designation of one of the plurality of pieces of angle content, the judgment unit judges whether the designated piece of angle content is usable, based on the contract information, and the selection unit selects a group of outputtable pieces of angle content according to the result of the judgment by the judgment unit, and selects one piece of angle content from the selected group, and the output unit outputs the selected piece of angle content.

According to this construction, the output of unusable content can be avoided when controlling multi-angle switching.

Here, the plurality of pieces of content may include a plurality of pieces of auxiliary content that are each made up of any of audio data and subtitle data output together with video data, wherein the acquisition unit acquires the designation of one of the plurality of pieces of auxiliary content, the judgment unit judges whether the designated piece of auxiliary content is usable, based on the contract information, the selection unit selects a group of outputtable pieces of auxiliary content according to the result of the judgment by the judgment unit, and selects one piece of auxiliary content from the selected group, and the output unit outputs the selected piece of auxiliary content.

According to this construction, the output of unusable content can be avoided when controlling playback of audio or subtitle data which accompanies video data.

Here, the plurality of pieces of content may each contain an encrypted digital work, wherein the output unit decrypts an encrypted digital work contained in the selected piece of content, and outputs the decrypted digital work.

According to this construction, the content use device decrypts the encrypted digital works in the composite content recorded on the recording medium and outputs the decrypted digital works. Accordingly, even if the composite content is copied to another recording medium unauthorizedly, the digital works in the copied composite content are protected from unauthorized use.

Also, the stated aim can be achieved by a recording medium on which composite content including a plurality of pieces of content is recorded, wherein the composite content includes a piece of content and an alternative piece of content in correspondence with each other, the alternative piece of content being to be output instead of the piece of content if the piece of content is not usable.

According to this construction, the output of unusable content can be avoided when the recording medium is used by the above content use device.

BRIEF DESCRIPTION OF DRAWINGS

FIG. 3 shows an example data structure of a playback path information table stored on the recording medium.

FIG. 5 shows an example data structure of a button data table stored on the recording medium.

FIG. 8 shows an example data structure of a key control information table stored on the recording medium.

FIG. 9 shows an example data structure of a media information table stored on the recording medium.

FIG. 10 shows an example data structure of a rights information table stored in a rights storage unit in the playback device.

BEST MODE FOR CARRYING OUT THE INVENTION

The following describes a content playback system 1 which is an embodiment of the present invention.

1.1. Construction of the Content Playback System 1

Figure 1:
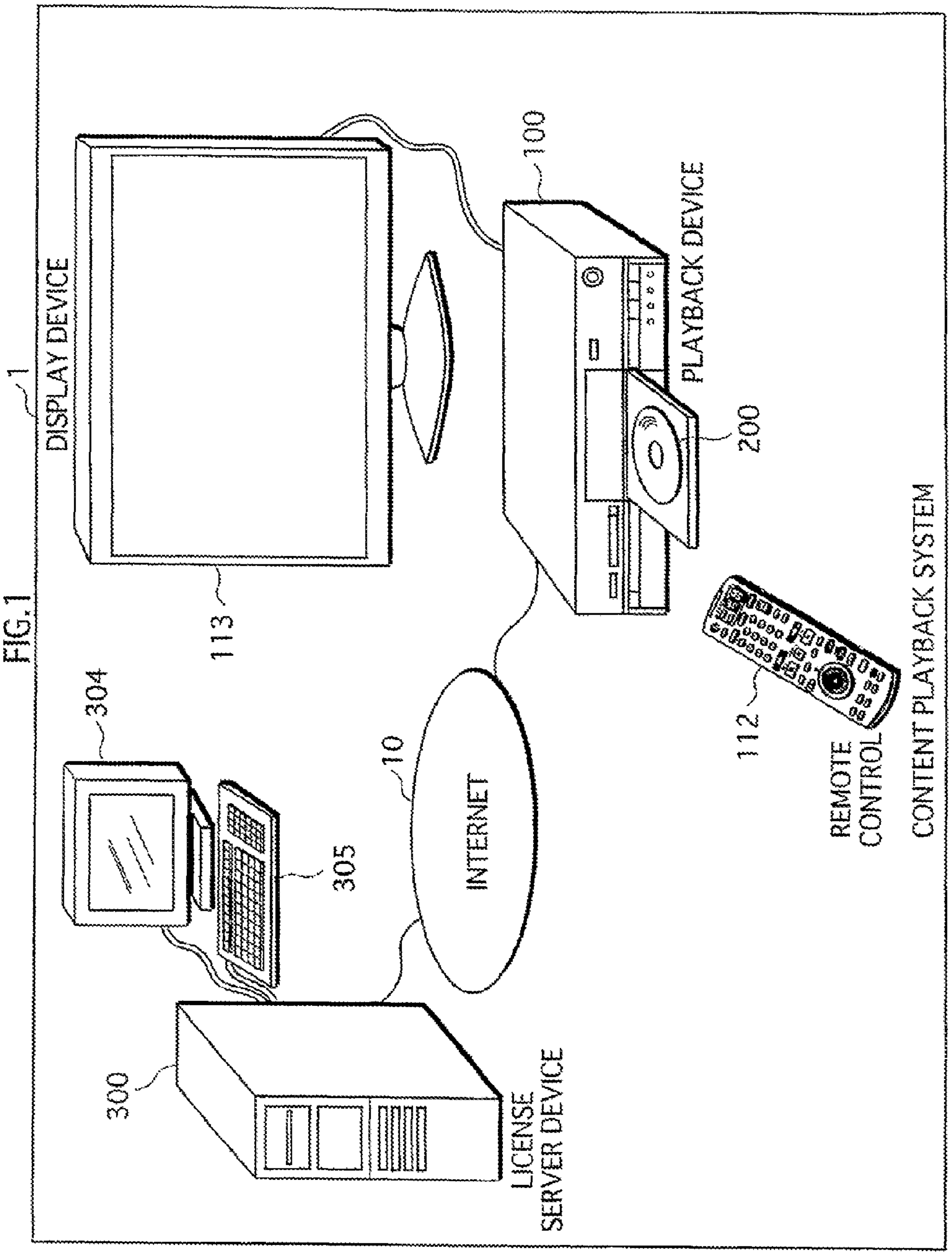
FIG. 1 shows an overall construction of a content playback system which is an embodiment of the present invention.

FIG. 1 shows a construction of the content playback system 1. As shown in the drawing, the content playback system 1 is roughly made up of a playback device 100 and a license server device 300 which are connected via an internet 10. A display device 113 such as a television monitor is connected with the playback device 100. Also, a recording medium 200 such as a BD is loaded to the playback device 100 by the user. The playback device 100 receives an operation from the user via a remote control 112. According to the received operation, the playback device 100 plays back content recorded on the recording medium 200, or acquires rights information relating to content from the license server device 300 and retains the acquired rights information.

1.2. Construction of the Recording Medium 200

Figure 2:
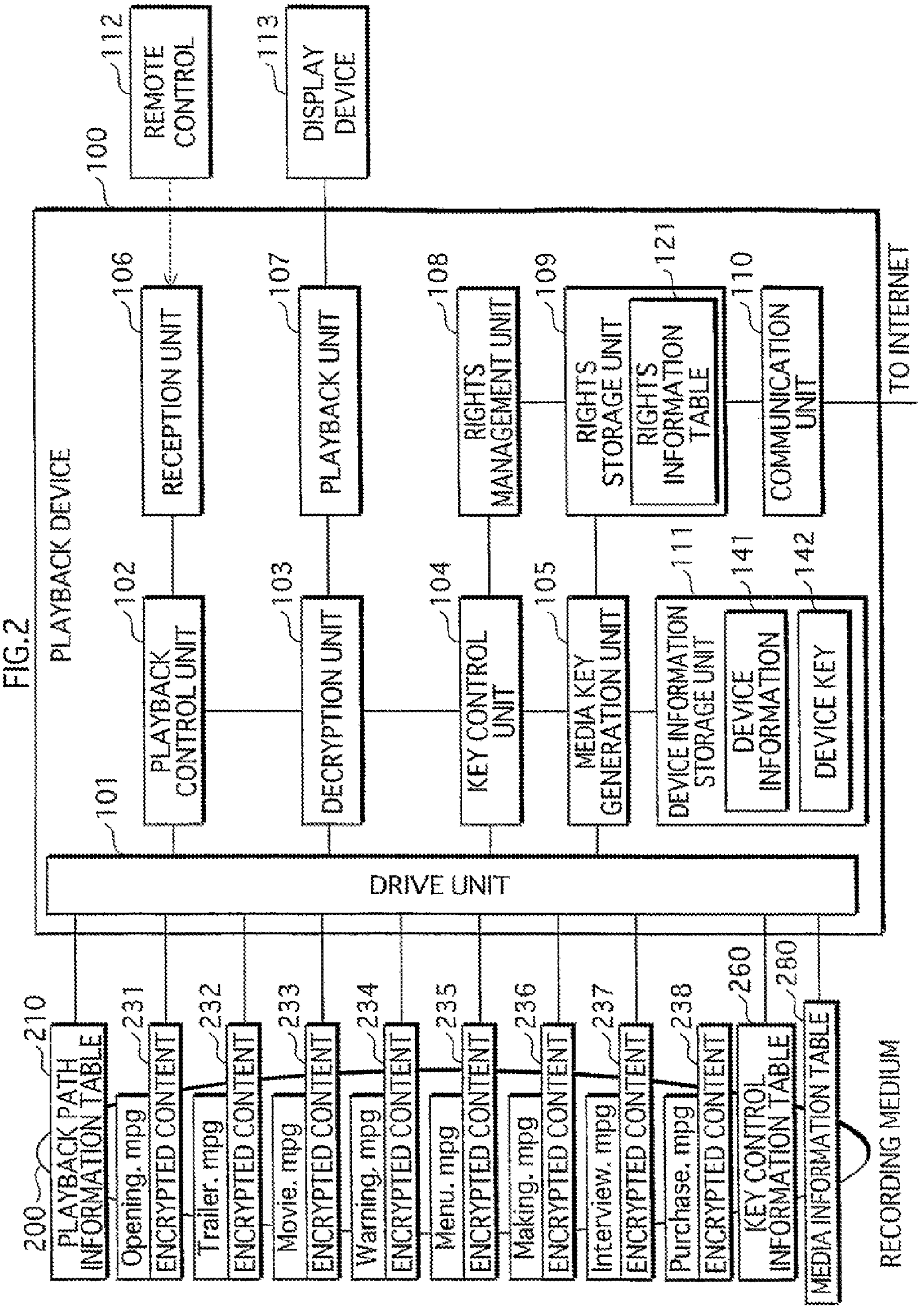
FIG. 2 shows an internal construction of a playback device and information stored on a recording medium shown in FIG. 1.

FIG. 2 shows information stored on the recording medium 200. As illustrated, the recording medium 200 stores a playback path information table 210, encrypted content 231, 232, . . . , 238, a key control information table 260, and a media information table 280, in advance. The playback path information table 210, the encrypted content 231, 232, . . . , 238, the key control information table 260, and the media information table 280 constitute composite content (compound content). The composite content referred to here is a type of content that includes a combination of different pieces of content.

(1) Playback Path Information Table 210

FIG. 3 shows an example of the playback path information table 210. In the drawing, the playback path information table 210 includes eight sets of playback control information 291, 292, . . . , 298, which each correspond to any of the encrypted content 231, 232, . . . , 238 recorded on the recording medium 200. These eight sets of playback control information 291, 292, . . . , 298 define an order in which the encrypted content 231, 232, . . . , 238 are decrypted and played back. Each set of playback control information includes a playback number, a content name, a next playback number, and an alternative playback number. Here, the playback control information may not include the alternative playback number, and further may not include the next playback number.

(Playback Number)

The playback number included in the playback control information is an index number for uniquely identifying the playback control information. The playback number begins with 1, and is incremented by 1 for each set of playback control information. For example, the playback control information 291 has a playback number 212 "1", which uniquely identifies the playback control information 291. Meanwhile, the playback control information 292 includes a playback number 217 "2", which uniquely identifies the playback control information 292.

(Content Name)

The content name included in the playback control information identifies encrypted content corresponding to the playback control information. As one example, the content name is a filename for uniquely identifying the encrypted content that is recorded on the recording medium 200 as one file.

(Next Playback Number)

The next playback number included in the playback control information designates playback control information corresponding to encrypted content that is to be decrypted and played next, when the decryption and playback of the encrypted content corresponding to the former playback control information have completed. The next playback number is not set if there is no encrypted content to be decrypted and played next.

For instance, the playback control information 291 has a next playback number 214 "2". Accordingly, after the decryption and playback of the encrypted content identified by a content name 213 "Opening.mpg" have completed, encrypted content corresponding to the playback control information 292 designated by the next playback number 214 "2", i.e. the encrypted content identified by a content name 218 "Trailer.mpg", is decrypted and played.

(Alternative Playback Number)

The alternative playback number included in the playback control information designates playback control information corresponding to encrypted content that is to be decrypted and played alternatively if the decryption and playback of the encrypted content designated by the next playback number are not permitted.

For instance, the playback control information 292 has a next playback number 219 "3" and an alternative playback number 220 "4". Suppose the decryption and playback of encrypted content corresponding to the playback control information 293 designated by the next playback number 219 "3", i.e. encrypted content identified by a content name 221 "Movie.mpg", are not permitted. In this case, after the decryption and playback of the encrypted content identified by the content name 218 "Trailer.mpg" have completed, encrypted content corresponding to the playback control information 294 designated by the alternative playback number 220 "4", i.e. encrypted content identified by a content name 222 "Warning.mpg", is decrypted and played.

If the playback control information includes no alternative playback number, the decryption and playback of the encrypted content designated by the next playback number are carried out irrespective of whether that encrypted content is playable or not.

(Playback Example)

Figure 4:
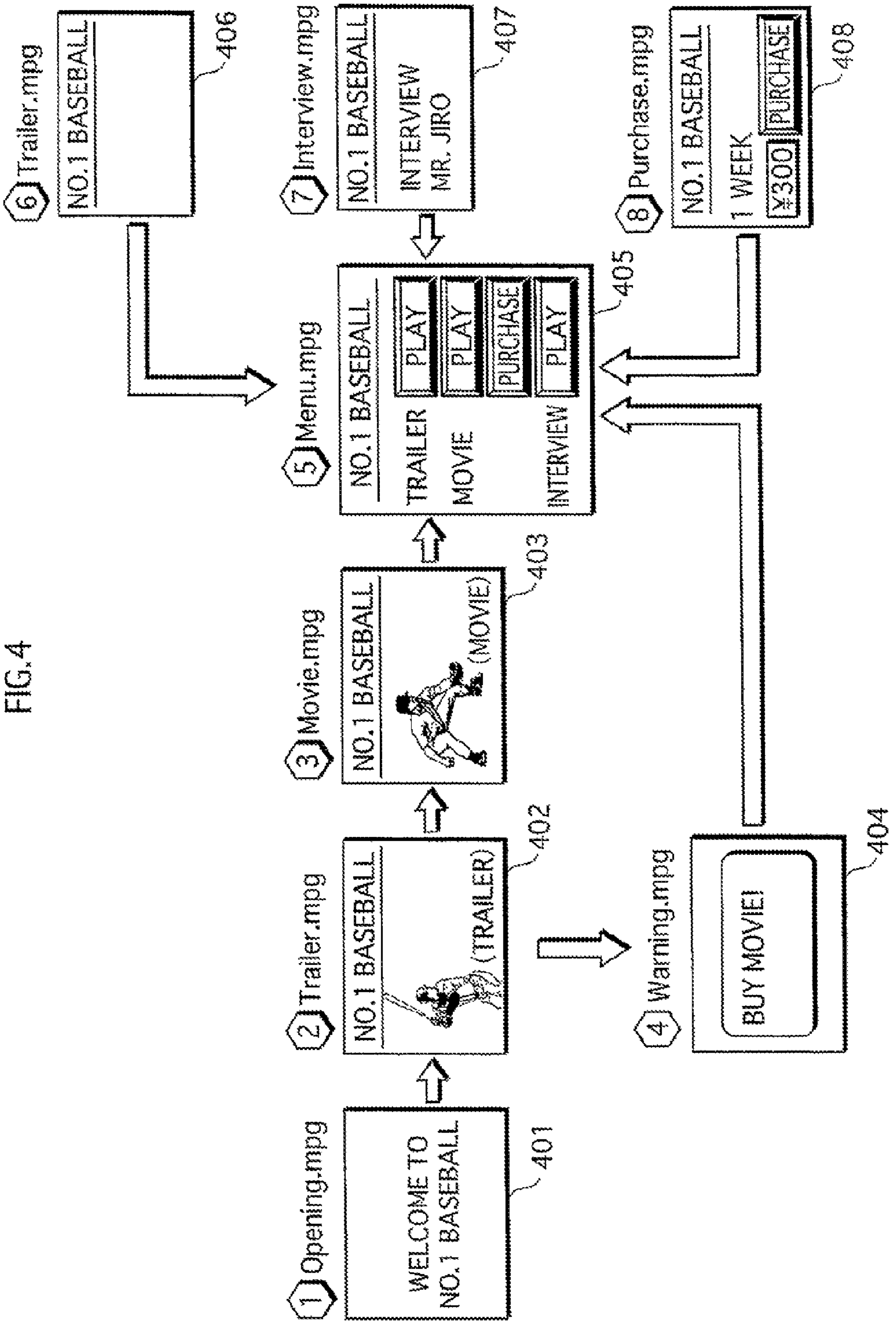
FIG. 4 shows an example of playback of video when the playback path information table shown in FIG. 3 is used.

FIG. 4 shows an example of playback when the playback path information table 210 shown in FIG. 3 is used.

As shown in FIG. 4, video 401 is played first, and then video 402 is played. After this, video 403 is played if playable, and then video 405 is played. If video 403 is unplayable, video 404 is played instead. Also, video 406, 407, and 408 are played depending on conditions.

Here, video 401, 402, . . . , 408 respectively correspond to the playback control information 291, 292, . . . , 298 shown in FIG. 3.

(2) Encrypted Content 231, 232, . . . , 238

The encrypted content 231, 232, . . . , 238 each constitute one file on the recording medium 200.

The encrypted content 231, 232, . . . , 238 have the same data structure. Which is to say, the encrypted content is obtained by applying an encryption algorithm to a payload of each packet of a transport stream, excluding an adaptation field, that is generated by multiplexing an MPEG-2 video elementary stream and an MPEG-2 audio elementary stream according to an MPEG-2 multiplexing system. The encryption algorithm referred to here is AES (Advanced Encrypt ion Standard) as one example, though other secret-key encryption algorithms are applicable too.

(Button Data Table 240)

If the encrypted content is menu display content, the encrypted content includes, in encrypted form, a button data table 240 for displaying buttons as a private stream, in addition to the video elementary stream and the audio elementary stream. It should be noted here that the manner in which the encrypted button data table is included is not limited to this.

Figure 6:
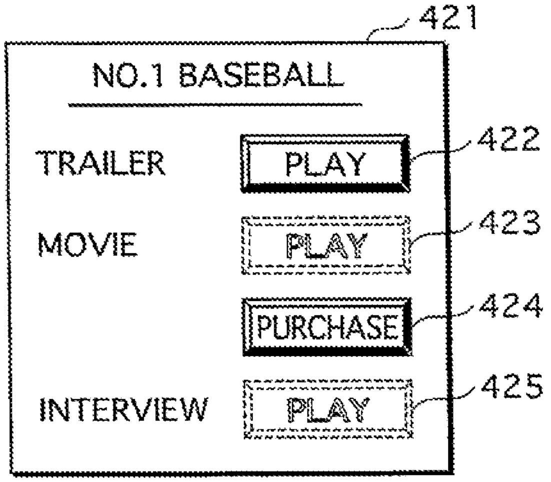
FIG. 6 shows an example of playback of video containing a plurality of buttons when the button data table shown in FIG. 5 is used.
Figure 7:
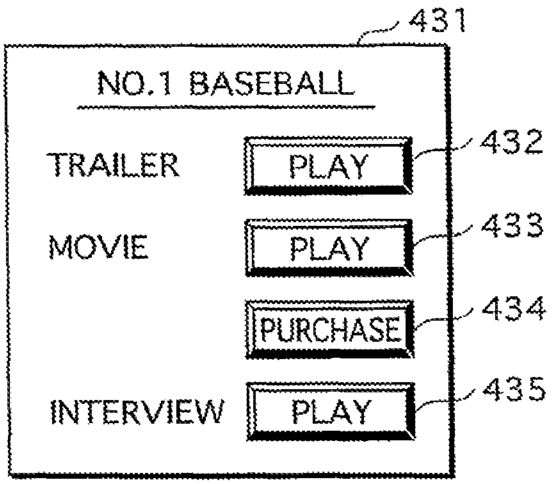
FIG. 7 shows another example of playback of video containing a plurality of buttons when the button data table shown in FIG. 5 is used.

FIG. 5 shows an example of the button data table 240. In the drawing, the button data table 240 includes four sets of button data, which respectively correspond to four buttons 422, 423, 424, and 425 in a menu display 421 shown in FIG. 6, and also respectively correspond to four buttons 432, 433, 434, and 435 in a menu display 431 shown in FIG. 7. Each set of button data includes a button number, a playback number, an upper button number, a lower button number, a left button number, a right button number, unselected data, selected data, and grayed-out data. Here, the button data may not include the grayed-out data.

(a) Button Number

The button number included in the button data is an index number for uniquely identifying the button data. The button number begins with 1, and is incremented by 1 for each set of button data. When the playback of the menu display content starts, a button corresponding to button data identified by a button number 241 "1" is put in a selected state.

(b) Playback Number

The playback number included in the button data identifies playback control information corresponding to encrypted content that is to be played when selection of a button corresponding to the button data is confirmed via the remote control 112.

For example, the button data identified by the button number 241 "1" has a playback number 242 "2". Accordingly, when a confirmation operation is made via the remote control 112 while the button corresponding to this button data is in a selected state, the encrypted content corresponding to the playback control information 292 that has the playback number 217 "2" in the playback path information table 210 in FIG. 3, i.e. the encrypted content identified by the content name 218 "Trailer.mpg", is decrypted and played.

(c) Upper Button Number

The upper button number included in the button data identifies button data corresponding to a button that is put into a selected state when an up movement operation is made via the remote control 112 while the button corresponding to the former button data is in a selected state.

For instance, the button data identified by the button number 241 "1" has an upper button number 243 "4". This being so, if an up movement operation is made via the remote control 112 while the button corresponding to this button data is in a selected state, a button corresponding to button data identified by the upper button number 243 "4" is put into a selected state.

(d) Lower Button Number

The lower button number included in the button data identifies button data corresponding to a button that is put into a selected state when a down movement operation is made via the remote control 112 while the button corresponding to the former button data is in a selected state.

(e) Left Button Number

The left button number included in the button data identifies button data corresponding to a button that is put into a selected state when a left movement operation is made via the remote control 112 while the button corresponding to the former button data is in a selected state.

(f) Right Button Number

The right button number included in the button data identifies button data corresponding to a button that is put into a selected state when a right movement operation is made via the remote control 112 while the button corresponding to the former button data is in a selected state.

(g) Unselected Data

The unselected data included in the button data is image data showing the button to be displayed when the button is in an unselected state.

(h) Selected Data

The selected data included in the button data is image data showing the button to be displayed when the button is in a selected state.

(i) Grayed-Out Data

The grayed-out data included in the button data is image data showing the button to be displayed when the button is in a grayed-out state, i.e., an unselectable state. This image data is created, for example, by replacing the alternate pixels of the unselected data with blank pixels. Such image data is less distinct than the unselected data, thereby indicating that the button cannot be selected. The grayed-out state is explained in more detail later.

(3) Key Control Information Table 260

FIG. 8 shows an example of the key control information table 260. As illustrated, the key control information table 260 includes a plurality of sets of key control information, which each correspond to any of the encrypted content 231, 232, . . . , 238 recorded on the recording medium 200. Each set of key control information includes a content name, content information, key generation information, playability information, copyability information, and rights mode information.

(Content Name)

The content name included in the key control information identifies encrypted content corresponding to the key control information. Like the content name in the playback path information table 210 shown in FIG. 3, the content name in the key control information table 260 shows a filename that identifies the corresponding encrypted content. Unlike the playback path information table 210, however, the same content name never appears more than once in the key control information table 260.

(Content Information)

The content information included in the key control information is used to generate a content key for decrypting the encrypted content corresponding to the key control information. The content information is unique to the corresponding encrypted content.

(Key Generation Information)

The key generation information included in the key control information specifies a method of generating the content key for the encrypted content corresponding to the key control information. The key generation information takes one of the values "00", "01", and "10". The value "00" indicates the content key is to be generated using a media key. The value "01" indicates the content key is to be generated using a composite key. The value "10" indicates the content key is to be generated using a rights key (also referred to as a license key). The media key, the composite key, and the rights key are explained in detail later.

(Playability Information)

The playability information included in the key control information shows whether the encrypted content corresponding to the key control information is playable or not. The playability information takes one of the values "1" and "0". The value "1" indicates the encrypted content is playable. The value "0" indicates the encrypted content is unplayable.

Although the playability information shows whether the encrypted content is playable or not in this example, this is not a limit for the present invention. For example, the playability information may show a playback quality, such that the encrypted content is judged as being unplayable if the playability information shows a high playback quality, and playable if the playability information shows a low playback quality.

(Copyability Information)

The copyability information included in the key control information shows whether the encrypted content corresponding to the key control information is copyable or not. The copyability information takes one of the values "01", "10", and "00". The value "01" indicates "Once", i.e. the content can be copied one generation. The value "10" indicates "Free", i.e. the content can be copied freely. The value "00" indicates "Never", i.e., the content is never to be copied.

Although the copyability information shows any of "Once", "Free", and "Never" in this example, the present invention is not limited to this. For example, the copyability information may show a copy quality. Also, the copyability information may contain information for specifying copy destination media.

(Rights Mode Information)

The rights mode information included in the key control information specifies one or more rights modes specified for the encrypted content corresponding to the key control information, when the key generation information in the key control information is "10" (rights key) or "01" (composite key). For instance, when the rights mode information is "01", mode A is specified for the content. When the rights mode information is "10", mode B is specified for the content. When the rights mode information is "01,10", modes A and B are specified for the content.

A rights mode mentioned here is a mode of generating rights for the content. As one example, mode A generates the rights based on a maximum number of times the playback of the content is permitted, whilst mode B generates the rights based on an expiration date until which the playback of the content is permitted.

When the key generation information in the key control information is "00" (media key), the rights mode information in the key control information is "00", indicating that no rights mode is specified.

In FIG. 8, for example, rights mode information 266 is "00", which means no rights mode is specified for content corresponding to key control information that includes the rights mode information 266.

Meanwhile, rights mode information 272 is "01", which means mode A is specified for content corresponding to key control information that includes the rights mode information 272. Accordingly, only rights that are generated in mode A are used as the rights for use of the content.

Also, rights mode information 273 is "01,10", which means modes A and B are specified for content corresponding to key control information that includes the rights mode information 273. Accordingly, rights that are generated in any of modes A and B are used as the rights for use of the content.

Further, rights mode information 274 is "10", which means mode B is specified for content corresponding to key control information that includes the rights mode information 274. Accordingly, only rights that are generated in mode B are used as the rights for use of the content.

(4) Media Information Table 280

FIG. 9 shows an example of the media information table 280. As illustrated, the media information table 280 includes a plurality of sets of media information, which each correspond to an individual playback device. Each set of media information includes device information and an encrypted media key.

(Device Information)

The device information included in the media information is uniquely given to a playback device corresponding to the media information.

(Encrypted Media key)

The encrypted media key included in the media information is generated by applying an encryption algorithm to a media key using a device key unique to the playback device corresponding to the media information. The encryption algorithm referred to here is AES as one example, though other secret-key encryption algorithms are equally applicable. The media key is uniquely assigned to the recording medium 200.

Thus, the media information table 280 contains encrypted media keys generated for separate playback devices. Suppose one playback device becomes unauthorized as a result of hacking or the like. In such a case, in the subsequent production of recording media a media information table that does not include media information corresponding to the unauthorized playback device is created and written to each recording medium. In so doing, playback of content by unauthorized devices can be prevented.

In this embodiment, the sets of media information as many as the playback devices are stored in the media information table 280. This unnecessarily increases a data size of the media information table 280. To avoid this, the data size of the media information table 280 may be reduced using a binary tree.

1.3. Construction of the Playback Device 100

FIG. 2 also shows a construction of the playback device 100. In the drawing, the playback device 100 includes a drive unit 101, a playback control unit 102, a decryption unit 103, a key control unit 104, a media key generation unit 105, a reception unit 106, a playback unit 107, a rights management unit 108, a rights storage unit 109, a communication unit 110, a device information storage unit 111, and a power supply unit (not illustrated) for supplying power to each construction element of the playback device 100.

The playback device 100 is actually realized by a computer system that is roughly made up of a CPU, a working memory, a flash memory, a BD drive, a video adapter, a network adapter, and the like. The drive unit 101 is realized by the BD drive. The reception unit 106 receives an operation from the remote control 112 via an infrared signal. The playback unit 107 is realized by the video adapter. The rights storage unit 109 and the device information storage unit 111 are realized by the flash memory. The communication unit 110 is realized by the network adapter. Also, the flash memory stores a plurality of computer programs showing operations of the playback control unit 102, the decryption unit 103, the key control unit 104, the media key generation unit 105, and the rights management unit 108. Functions of the playback control unit 102, the decryption unit 103, the key control unit 104, the media key generation unit 105, and the rights management unit 108 are achieved by the CPU operating in accordance with the corresponding computer programs.

(1) Device Information Storage Unit 111 and Rights Storage Unit 109

(Device Information Storage Unit 111)

The device information storage unit 111 stores device information 141 and a device key 142 beforehand, as shown in FIG. 2.

The device information 141 is uniquely given to the playback device 100. The device key 142 is uniquely given to the playback device 100.

(Rights Storage Unit 109)

The rights storage unit 109 stores a rights information table 121 beforehand, as shown in FIG. 2.

FIG. 10 shows an example of the rights information table 121. In the drawing, the rights information table 121 includes a plurality of sets of rights information, which each correspond to any of the encrypted content 231, 232, . . . , 238, and show rights to play back the corresponding content.

Each set of rights information is made up of rights mode information, a content name, a rights key, a playback count, and a playback expiration date. Here, the rights information may not include the playback count or the playback expiration date.

The rights mode information included in the rights information shows a rights mode specified for the encrypted content corresponding to the rights information. The rights mode represents a method of generating rights for use of the content.

The content name included in the rights information identifies the encrypted content corresponding to the rights information. Like the content name included in the playback path information table 210 shown in FIG. 3, the content name in the rights information table 121 is a filename that uniquely identifies the corresponding content.

The rights key included in the rights information is key information given to the rights shown by the rights information.

The playback count included in the rights information is a maximum number of times the playback of the corresponding content is permitted. The absence of the playback count in the rights information means the content can be played back an unlimited number of times.

The playback expiration date included in the rights information shows an expiration date until which the playback of the corresponding content is permitted. The absence of the playback expiration date in the rights information means the content can be played back without a time limit.

Though the rights information is made up of the five items, i.e. the rights mode information, the content name, the rights key, the playback count, and the playback expiration date in the above example, the present invention is not limited to this. For instance, the rights information may include other items such as a playback device limitation, a user limitation, and a geographical area limitation.

(2) Playback Control Unit 102

The playback control unit 102 receives an instruction to play back content recorded on the recording medium 200, from the reception unit 106. The playback control unit 102 also receives a signal indicating detection of insertion of the recording medium 200, from the drive unit 101.

Upon receiving the playback instruction from the reception unit 106 or the detection signal from the drive unit 101 immediately after receiving power from the power supply unit, the playback control unit 102 outputs an instruction to decrypt the content recorded on the recording medium 200, to the decryption unit 103.

After this, the playback control unit 102 receives decryption failure notification indicating that the content decryption has failed or media key acquisition success notification indicating that media key acquisition has succeeded, from the decryption unit 103. Upon receiving the decryption failure notification, the playback control unit 102 terminates the subsequent playback control operation. Upon receiving the media key acquisition success notification, the playback control unit 102 performs the playback control operation as follows.

(Playback Control Operation)

The playback control unit 102 has the drive unit 101 read playback control information having the playback number "1" from the playback path information table 210 on the recording medium 200. The playback control unit 102 extracts a content name from the read playback control information, and outputs the extracted content name to the decryption unit 103. The playback control unit 102 instructs the decryption unit 103 to decrypt and play encrypted content identified by the content name.

Once the decryption and playback of the encrypted content identified by the content name have completed, the playback control unit 102 attempts to extract a next playback number from the playback control information. If there is no next playback number in the playback control information, the playback control unit 102 ends the playback control operation.

If there is a next playback number in the playback control information, the playback control unit 102 has the drive unit 101 read playback control information whose playback number matches the extracted next playback number from the playback path information table 210. The playback control unit 102 then extracts a content name from the read playback control information, and outputs the extracted content name to the rights management unit 108 via the decryption unit 103 and the key control unit 104. The playback control unit 102 inquires of the rights management unit 108 whether encrypted content identified by the content name is playable or not, via the decryption unit 103 and the key control unit 104.

If the rights management unit 108 replies that the content is unplayable, the playback control unit 102 extracts an alternative playback number from the playback control information. The playback control unit 102 has the drive unit 101 read playback control information whose playback number matches the extracted alternative playback number from the playback path information table 210. The playback control unit 102 then extracts a content name from the read playback control information, outputs the extracted content name to the decryption unit 103, and instructs the decryption unit 103 to decrypt and play encrypted content identified by the content name. Once the decryption and playback of the encrypted content have completed, the playback control unit 102 attempts to extract a next playback number from the playback control information. If no next playback number is included in the playback control information, the playback control unit 102 ends the playback control operation.

If the rights management unit 108 replies that the content is playable, on the other hand, the playback control unit 102 outputs the content name to the decryption unit 103, and instructs the decryption unit 103 to decrypt and play the encrypted content identified by the content name. Once the decryption and playback of the encrypted content have completed, the playback control unit 102 attempts to extract a next playback number from the playback control information. If the playback control information has no next playback number, the playback control unit 102 ends the playback control operation.

If the playback control information has a next playback number, the playback control unit 102 repeats the above operation until no next playback number is extracted.

(3) Decryption Unit 103, Playback Unit 107, and Display Device 113

(Decryption Unit 103)

The decryption unit 103 receives an instruction to decrypt the content recorded on the recording medium 200 from the playback control unit 102, and outputs an instruction to acquire a media key to the key control unit 104.

After this, the decryption unit 103 receives media key acquisition failure notification indicating that the media key acquisition has failed or media key acquisition success notification indicating that the media key acquisition has succeeded, from the key control unit 104. Upon receiving the media key acquisition failure notification, the decryption unit 103 outputs decryption failure notification indicating that the content decryption has failed, to the playback control unit 102. Upon receiving the media key acquisition success notification, the decryption unit 103 outputs the media key acquisition success notification to the playback control unit 102.

The decryption unit 103 then receives a content name and an instruction to decrypt encrypted content identified by the content name, from the playback control unit 102. The decryption unit 103 has the key control unit 104 acquire a content key corresponding to the encrypted content, and has the drive unit 101 read the encrypted content from the recording medium 200.

If the decryption unit 103 receives content key acquisition failure notification indicating that the content key acquisition has failed from the key control unit 104, the decryption unit 103 outputs decryption failure notification indicating that the content decryption has failed to the playback control unit 102, and terminates the subsequent operation.

Next, the decryption unit 103 judges whether the read encrypted content contains an encrypted button data table. This judgment can be made by checking whether the encrypted content contains a private stream with reference to an unencrypted PAT (Program Association Table) or PMT (Program Map Table) in the encrypted content, though this is not a limit for the present invention.

(a) If the encrypted content does not contain an encrypted button data table, the decryption unit 103 decrypts the encrypted content in units of packets using the content key, and outputs the decrypted content to the playback unit 107.

(b) If the encrypted content contains an encrypted button data table, the decryption unit 103 decrypts the encrypted button data table using the content key, and performs the following process (i) to (iv) on each set of button data in the decrypted button data table.

(i) The decryption unit 103 extracts a playback number from the button data.

(ii) The decryption unit 103 acquires a content name corresponding to the extracted playback number from the playback path information table 210, via the drive unit 101. In detail, the decryption unit 103 has the drive unit 101 read playback control information whose playback number matches the extracted playback number from the playback path information table 210 on the recording medium 200, and extracts a content name from the read playback control information.

(iii) The decryption unit 103 outputs the content name to the rights management unit 108 via the key control unit 104, and inquires of the rights management unit 108 whether content identified by the content name is playable or not, via the key control unit 104.

(iv) If the rights management unit 108 replies that the content is playable, the decryption unit 103 extracts unselected data and selected data that represent normal button display, from the button data. If the rights management unit 108 replies that the content is unplayable, the decryption unit 103 extracts grayed-out data that represents grayed-out button display, from the button data. This completes the process (i) to (iv).

The decryption unit 103 then decrypts the encrypted content in units of packets using the content key, and outputs the decrypted content to the playback unit 107.

The decryption unit 103 also outputs the selected data and unselected data or the grayed-out data extracted for each set of button data, to the playback unit 107.

(Playback Unit 107)

The playback unit 107 receives decrypted content from the decryption unit 103, and decodes it to generate digital video and audio data. The playback unit 107 generates analog video and audio signals from the digital video and audio data, and outputs the analog video and audio signals to the display device 113.

Also, the playback unit 107 receives selected data and unselected data or grayed-out data extracted for each set of button data from the decryption unit 103, and overlays the selected data and unselected data or the grayed-out data on the video data to display each button. In this way, the display state of each button is varied depending on playability of content corresponding to the button. Which is to say, the button is displayed in a normal state if the content is playable, and in a grayed-out state if the content is unplayable. When the button is grayed out, it is impossible to confirm the selection of the button.

(Display Device 113)

The display device 113 receives analog video and audio signals from the playback unit 107, and outputs the video signal as video and the audio signal as sounds.

(4) Key Control Unit 104

The key control unit 104 receives an instruction to acquire a media key from the decryption unit 103, and outputs an instruction to generate the media key to the media key generation unit 105.

Following this, the key control unit 104 receives either a decrypted media key or media key generation failure notification indicating that the media key generation has failed, from the media key generation unit 105.

Upon receiving the media key generation failure notification, the key control unit 104 outputs media key acquisition failure notification indicating that the media key acquisition has failed, to the decryption unit 103.

Upon receiving the decrypted media key, the key control unit 104 outputs media key acquisition success notification indicating that the media key acquisition has succeeded, to the decryption unit 103.

(Content Key Acquisition)

The key control unit 104 then acquires a content key in the following manner, according to an instruction from the decryption unit 103.

The key control unit 104 receives a content name and a content key acquisition instruction from the decryption unit 103. The key control unit 104 has the drive unit 101 read key control information having the received content name from the key control information table 260 on the recording medium 200, and extracts key generation information from the read key control information.

The key control unit 104 judges whether the key generation information is "00" which indicates "media key". If the key generation information is "00", the key control unit 104 extracts content information from the key control information, and concatenates the decrypted media key received from the media key generation unit 105 and the extracted content information in this order. The key control unit 104 then applies a one-way function to the concatenation outcome, to thereby generate the content key. The one-way function referred to here is SHA-1 as one example.

(content key)=SHA-1 ((decrypted media key)||(content information))

Here, "SHA-1 (X)" denotes a hash value obtained by converting X by SHA-1, and "A||B" denotes an outcome of concatenating A and B in this order.

It should be noted here that the generation of the content key is not limited to the above. For example, other hash functions or one-way functions may be used. Alternatively, the content key may be generated by decrypting the content information using the decrypted media key.

The key control unit 104 outputs the generated content key to the decryption unit 103.

If the key generation information is not “00”, the key control unit 104 extracts rights mode information from the key control information, and outputs the content name and the rights mode information to the rights management unit 108. The key control unit 104 controls the rights management unit 108 to acquire a rights key corresponding to content identified by the content name. If the key control unit 104 receives rights key acquisition failure notification indicating that the rights key acquisition has failed from the rights management unit 108, the key control unit 104 outputs content key acquisition failure notification indicating that the content key acquisition has failed to the decryption unit 103, and ends the subsequent operation.

Next, the key control unit 104 judges whether the key generation information is “01” or “10”. If the key generation information is “10” which indicates “rights key”, the key control unit 104 sets the acquired rights key as the content key, and outputs the content key to the decryption unit 103.

Though the rights key itself is set as the content key if the key generation information indicates “rights key” in the above example, the present invention is not limited to such. For instance, the content key may be generated from the rights key and the content information using a one-way function. Also, the generation of the content key from the rights key may be performed not by the key control unit 104 but by the rights management unit 108. This enhances security especially when the key control unit 104 and the rights management unit 108 are implemented as separate tamper-resistant modules, because the rights key need not be output to the key control unit 104.

If the key generation information is “01” which indicates “composite key”, the key control unit 104 concatenates the decrypted media key and the acquired rights key in this order, and performs a one-way function on the concatenation outcome to generate the content key.

(content key)=SHA-1 ((decrypted media key)||(rights key))

The key control unit 104 outputs the generated content key to the decryption unit 103.

Note here that the generation of the content key is not limited to the use of a one-way function. For instance, the content key may be generated by decrypting the content information using the decrypted media key, or by decrypting the rights key in encrypted form using the decrypted media key. The content information may be used in the generation of the content key. Especially when the key control unit 104 and the rights management unit 108 are implemented as separate tamper-resistant modules, the key control unit 104 may generate information from the decrypted media key and the content information and notify it to the rights management unit 108, which then generates the content key from the notified information and the rights key. This makes it unnecessary to output the decrypted media key to the rights management unit 108 and the rights key to the key control unit 104, which contributes to higher security.

(Content Playability Judgment)

When playability of content needs to be judged during the playback control operation, the key control unit 104 reads key control information corresponding to the content from the recording medium 200 and judges the playability of the content, in the following way.

The key control unit 104 receives a content name and an instruction to judge playability of content identified by the content name, from the decryption unit 103. In response, the key control unit 104 has the drive unit 101 read key control information having the received content name from the key control information table 260 on the recording medium 200, and extracts key generation information from the read key control information.

The key control unit 104 judges whether the key generation information is “00” which indicates “media key”. If the key generation information is “00”, the key control unit 104 extracts playability information from the key control information, and judges whether the playability information is “0” or “1”. If the playability information is “1”, the key control unit 104 outputs playback permission notification indicating that the content is playable, to the decryption unit 103. If the playability information is “0”, the key control unit 104 outputs playback prohibition information indicating that the content is unplayable, to the decryption unit 103.

If the key generation information is not “00”, the key control unit 104 extracts the playability information from the key control information, and judges whether the playability information is “0” or “1”. If the playability information is “1”, the key control unit 104 outputs playback permission notification to the decryption unit 103. If the playability information is “0”, the key control unit 104 extracts rights mode information from the key control information, and outputs the rights mode information, the content name, and a rights judgment instruction to the rights management unit 108. The key control unit 104 then receives a judgment result on the playability of the content from the rights management unit 108, and outputs the judgment result to the decryption unit 103.

In the case where the key generation information is not “00”, even when the content is judged as being playable, the content key cannot be obtained and therefore the content cannot be decrypted and played unless the rights management unit 108 acquires the rights key. To avoid any confusion resulting from this, it is more preferable to judge the content as being playable after confirming the presence of the rights key, than to judge the content as being playable simply based on the playability information.

(5) Media key Generation Unit 105

The media key generation unit 105 receives a media key generation instruction from the key control unit 104. In response, the media key generation unit 105 reads the device information 141 from the device information storage unit 111. The media key generation unit 105 have the drive unit 101 read media information from the media information table 280 on the recording medium 200, and extracts device information from the read media information. The media key generation unit 105 compares the extracted device information with the device information 141.

If the extracted device information does not match the device information 141, the media key generation unit 105 repeats the reading of next media information from the media information table 280, the extraction of device information from the read media information, and the comparison, until every set of media information has been read from the media information table 280.

If the same device information as the device information 141 is not found in the media information table 280, the media key generation unit 105 outputs media key generation failure notification indicating that the media key generation has failed, to the key control unit 104.

If the extracted device information matches the device information 141, on the other hand, the media key generation unit 105 reads the device key 142 from the device information storage unit ill, and extracts an encrypted media key from the read media information. The media key generation unit 105 decrypts the encrypted media key using the device key 142 according to AES, and outputs the decrypted media key to the key control unit 104.

(6) Rights Management Unit 108

(Rights Key Acquisition)

The rights management unit 108 receives a content name and rights mode information from the key control unit 104. The rights management unit 108 judges whether the rights mode information is "00", "01", "10", or "01,10", to judge whether any rights mode is specified for content identified by the content name.

If a rights mode is specified for the content, that is, if the rights mode information is "01", "10", or "01, 10", the rights management unit 108 attempts to extract rights information having both the received rights mode information and content name, from the rights information table 121 in the rights storage unit 109.

In more detail, if the rights mode information is "01", the rights management unit 108 attempts to extract rights information having both the rights mode information "01" and the content name. If the rights mode information is "10", the rights management unit 108 attempts to extract rights information having both the rights mode information "10" and the content name. If the rights mode information is "01,10", the rights management unit 108 attempts to extract rights information having both the rights mode information "01" and the content name, and rights information having both the rights mode information "10" and the content name.

Suppose the rights mode information specifies mode A and the content name is "Making.mpg". In this case, rights information 132, and not rights information 133, is extracted from the rights information table 121 shown in FIG. 10. Suppose the rights mode information specifies modes A and B and the content name is "Making.mpg". In this case, the rights information 132 and the rights information 133 are extracted from the rights information table 121.

If no rights mode is specified for the content, that is, if the rights mode information is "00", the rights management unit 108 attempts to extract rights information having the content name from the rights information table 121.

For instance, if the rights mode information specifies no rights mode and the content name is "Movie.mpg", rights information 131 is extracted from the rights information table 121 shown in FIG. 10.

As a result, either at least one set of rights information is extracted, or no set of rights information is extracted at all.

In this embodiment, playback of content is instructed after judging the playability of the content. Accordingly, the failure to extract rights information means the occurrence of some kind of problem such as an unauthorized attack.

If a plurality of sets of rights information are extracted, the rights management unit 108 selects one of the sets of rights information. If one set of rights information is extracted, the rights management unit 108 selects that rights information. The rights management unit 108 then judges whether the content identified by the content name is playable, using a playback count and/or a playback expiration date included in the selected rights information.

When using the playback count, the rights management unit 108 judges the content as being playable if the playback count is not "0", and unplayable if the playback count is "0".

When using the playback expiration date, the rights management unit 108 judges the content as being playable if a current time shown by a clock equipped in the rights management unit 108 is within the playback expiration date, and unplayable if the current time exceeds the playback expiration date.

When using both the playback count and the playback expiration date, the rights management unit 108 judges the content as being playable if both of the above judgments are affirmative, and unplayable if any of the above judgments is negative.

If the content is judged as being playable, the rights management unit 108 extracts a rights key from the selected rights information, and outputs the rights key to the key control unit 104.

If the content is judged as being unplayable, it means the rights key acquisition has failed, as in the case where no set of rights information is extracted. When this happens, the rights management unit 108 outputs rights key acquisition failure notification indicating that the rights key acquisition has failed, to the key control unit 104.

(Content Playability Judgment)

The rights management unit 108 receives a rights judgment instruction, a content name, and rights mode information from the key control unit 104. The rights management unit 108 then judges whether the rights mode information is "00", "01", "10", or "01,10", to judge whether any rights mode is specified for content identified by the content name, in the same way as above.

If a rights mode is specified for the content, the rights management unit 108 attempts to extract rights information having both the received rights mode information and content name from the rights information table 121 in the rights storage unit 109, in the same way as above.

If no rights mode is specified for the content, the rights management unit 108 attempts to extract rights information having the received content name from the rights information table 121, in the same way as above.

As a result, either at least one set of rights information is extracted, or no set of rights information is extracted.

If at least one set of rights information is extracted, the rights management unit 108 selects one set of rights information, and judges whether the content is playable based on a playback count and/or a playback expiration date included in the selected rights information, in the same way as above.

If the content is judged as being playable as a result, the rights management unit 108 outputs a judgment result indicating that the content is playable, to the key control unit 104.

If the content is judged as being unplayable, the rights management unit 108 outputs a judgment result indicating that the content is unplayable, to the key control unit 104.

If no set of rights information is extracted, the rights management unit 108 outputs a judgment result indicating that the content is unplayable, to the key control unit 104.

(7) Remote Control 112, Reception Unit 106, Drive Unit 101, and Communication Unit 110

(Remote Control 112)

The remote control 112 has an enclosure that is formed by an upper case and a lower case, as shown in FIG. 1. In the enclosure, a flat wiring board is held by the lower case. Also, a plurality of operation buttons are provided on the upper case. These operation buttons are engraved with such legends that indicates activation, confirmation, playback, the numerals 1 to 12, and up, down, left, and right movements.

Switches which are opened and closed according to the user' s button operations are disposed on the wiring board at the positions corresponding to the operation buttons. Furthermore, an infrared radiation unit and a conversion circuit are formed on the wiring board.

When a switch is opened or closed as a result of the user' s operation on a corresponding button, the conversion circuit detects the opening or closing of the switch, generates an electrical signal corresponding to the opening or closing of the switch, converts the electrical signal to a digital signal, and outputs the digital signal to the infrared radiation unit. The infrared radiation unit receives the digital signal, and emits or stops an infrared ray depending on the digital signal.

In so doing, the remote control 112 radiates an infrared ray carrying a signal corresponding to the user' s button operation.

(Reception Unit 106)

The reception unit 106 receives an infrared ray from the remote control 112, extracts a signal corresponding to a button operation from the infrared ray, and outputs the extracted signal to the playback control unit 102.

For example, if the extracted signal shows a playback operation, the reception unit 106 outputs a playback instruction to the playback control unit 102.

(Communication Unit 110)

The communication unit 110 is connected to the license server device 300 via the internet 10.

To acquire rights, the communication unit 110 establishes an encrypted channel, such as a SAC (Secure Authentication Channel), with a communication unit 301 in the license server device 300. In detail, the communication unit 110 shares a session key with the license server device 300. The communication unit 110 then requests transmission of rights from the license server device 300. The communication unit 110 receives encrypted rights information from the communication unit 301 in response, decrypts the encrypted rights information using the session key, and writes the decrypted rights information to the rights information table 121 in the rights storage unit 109.

(Drive Unit 101)

The drive unit 101 reads information from the recording medium 200, under control of any of the playback control unit 102, the decryption unit 103, the key control unit 104, and the media key generation unit 105. The drive unit 101 outputs the read information to the corresponding unit.

1.4. Construction of the License Server Device 300

Figure 11:
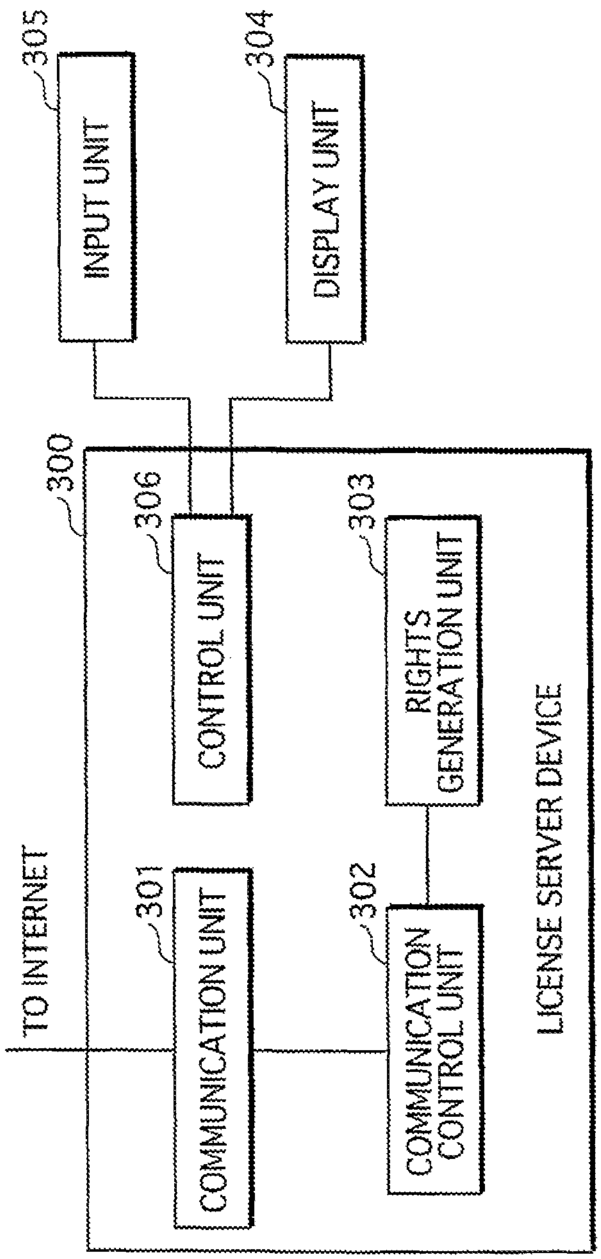
FIG. 11 shows an internal construction of a license server device shown in FIG. 1.

FIG. 11 shows a construction of the license server device 300. In the drawing, the license server device 300 includes the communication unit 301, a communication control unit 302, a rights generation unit 303, and a control unit 306. A display unit 304 and an input unit 305 are connected to the license server device 300.

The license server device 300 is actually realized by a computer system that includes a microprocessor, a ROM, a RAM, a hard disk unit, a communication unit (network adapter), a display unit, a keyboard, and a mouse. A computer program is stored on the RAM or the hard disk unit. Functions of the construction elements of the license server device 300 are achieved by the microprocessor operating in accordance with this computer program.

The communication unit 301 is connected to the playback device 100 via the internet 10. The communication unit 301 establishes an encrypted channel such as a SAC with the communication unit 110 in the playback device 100, under control of the communication control unit 302. To do so, the communication unit 301 shares a session key with the playback device 100. After establishing the encrypted channel, the communication unit 301 transfers information between the rights generation unit 303 and the playback device 100, under control of the communication control unit 302.

The rights generation unit 303 receives a request for transmission of rights from the playback device 100 via the internet 10, the communication unit 301, and the communication control unit 302, after the establishment of the encrypted channel. The rights generation unit 303 responsively generates rights information for the playback device 100, encrypts the rights information using the session key, and transmits the encrypted rights information to the playback device 100 via the communication control unit 302, the communication unit 301, and the internet 10.

The input unit 305 receives an operation from the operator of the license server device 300, and outputs the received operation to the control unit 306.

The display unit 304 displays information under control of the control unit 306.

1.5. Operations of the Content Playback System 1

Operations of the content playback system 1 are described below.

(1) Content Playback Start Operation

Figure 12:
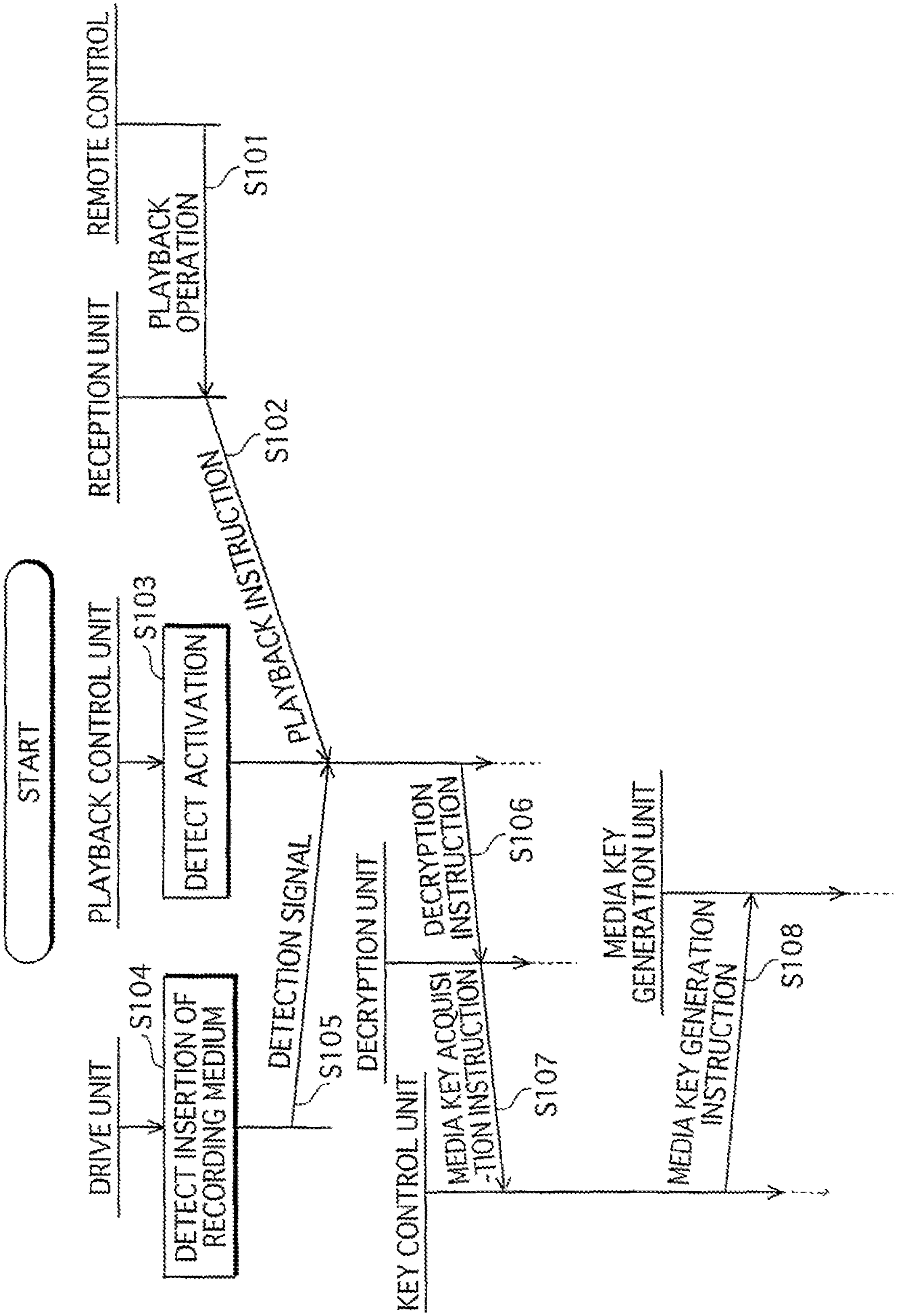
FIG. 12 is a flowchart of a content playback start operation by the playback device.

FIG. 12 is a flowchart of an operation of the playback device 100 at the start of content playback.

Upon receiving power from the power supply unit (S103), a playback operation from the remote control 112 via the reception unit 106 (S101-S102), or a signal indicating detection of insertion of the recording medium 200 from the drive unit 101 (S104-S105), the playback control unit 102 outputs a content decryption instruction to the decryption unit 103 (S106). The decryption unit 103 outputs a media key acquisition instruction to the key control unit 104 (S107). The key control unit 104 outputs a media key generation instruction to the media key generation unit 105 (S108).

(2) Media Key Generation Operation by the Media Key Generation Unit 105

Figure 13:
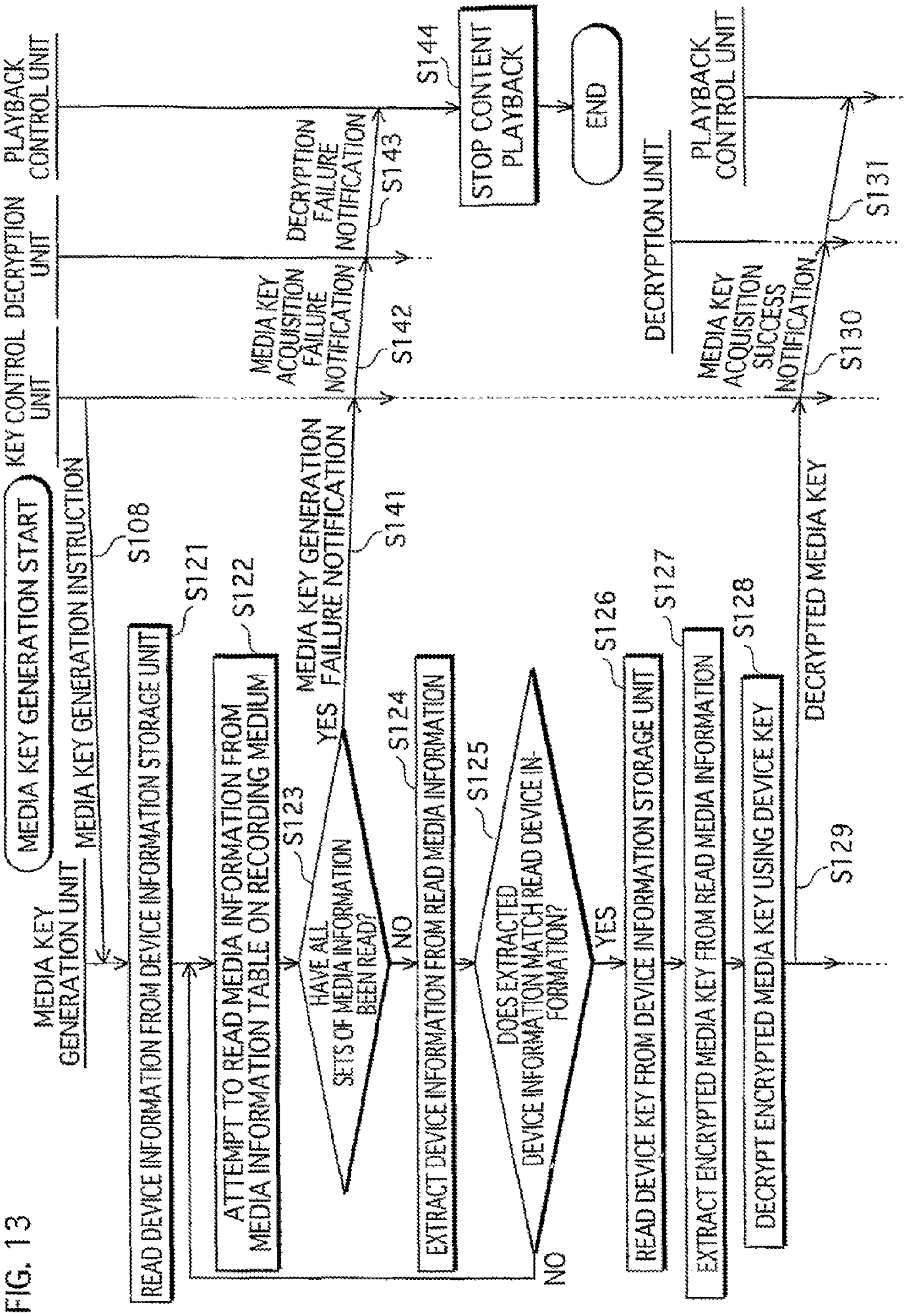
FIG. 13 is a flowchart of a media key generation operation by a media key generation unit in the playback device.

FIG. 13 is a flowchart of a media key generation operation by the media key generation unit 105.

Upon receiving the media key generation instruction from the key control unit 104 (S108), the media key generation unit 105 reads the device information 141 from the device information storage unit 111 (S121).

Next, the media key generation unit 105 attempts to read one set of media information from the media information table 280 on the recording medium 200 (S122). If all sets of media information have already been read from the media information table 280 (S123:YES), the media key generation unit 105 outputs media key generation failure notification to the key control unit 104 (S141), since the same device information as the device information 141 is not included in the media information table 280. The key control unit 104 outputs media key acquisition failure notification to the decryption unit 103 (S142). The decryption unit 103 outputs decryption failure notification to the playback control unit 102 (S143). The playback control unit 102 terminates the subsequent content playback operation (S144).

If any set of media information has not yet been read from the media information table 280 (S123:NO), the media key generation unit 105 extracts device information from the read media information (S124), and compares the extracted device information with the device information 141 (S125). If they do not match (S125:NO), the operation returns to step 5122.

If they match (S125:YES), the media key generation unit 105 reads the device key 142 from the device information storage unit 111 (S126). The media key generation unit 105 also extracts an encrypted media key from the read media information (S127). The media key generation unit 105 decrypts the encrypted media key using the device key 142 (S128), and outputs the decrypted media key to the key control unit 104 (S129). The key control unit 104 outputs media key acquisition success notification to the decryption unit 103

(S130). The decryption unit 103 outputs the media key acquisition success notification to the playback control unit 102 (S131).

(3) Content Playback Control Operation by the Playback Control Unit 102

Figure 14:
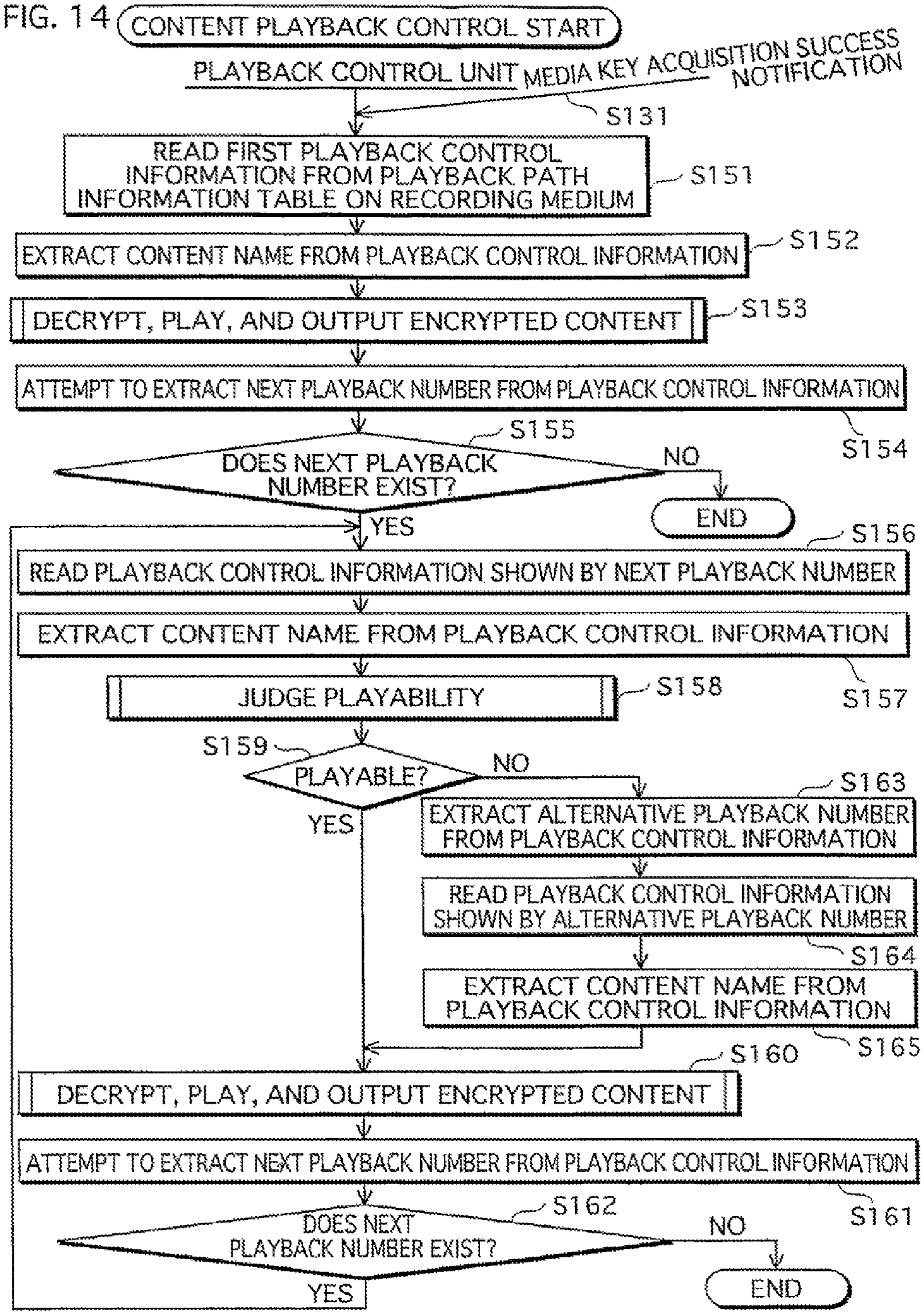
FIG. 14 is a flowchart of a content playback control operation by a playback control unit in the playback device.

FIG. 14 is a flowchart of a content playback control operation by the playback control unit 102.

Upon receiving the media key acquisition success notification from the decryption unit 103 (5131), the playback control unit 102 reads playback control information having the playback number "1" from the playback path information table 210 (S151). The playback control unit 102 extracts a content name from the read playback control information (S152), and instructs the decryption unit 103 to decrypt and play back encrypted content identified by the extracted content name (S153). After this, the playback control unit 102 attempts to extract a next playback number from the playback control information (S154). If the playback control information has no next playback number (S155:NO), the playback control unit 102 ends the operation.

If the playback control information has a next playback number (S155:YES), the playback control unit 102 reads playback control information whose playback number matches the extracted next playback number, from the playback path information table 210 (5156). The playback control unit 102 extracts a content name from the read playback control information (S157), and inquires of the rights management unit 108 whether encrypted content identified by the extracted content name is playable (S158).

If the rights management unit 108 judges that the content is unplayable (S159:NO), the playback control unit 102 extracts an alternative playback number from the read playback control information (S163). The playback control unit 102 then reads playback control information whose playback number matches the extracted alternative playback number from the playback path information table 210 (S164), and extracts a content name from the read playback control information (S165).

The playback control unit 102 instructs the decryption unit 103 to decrypt and play encrypted content identified by the extracted content name (S160). The playback control unit 102 then attempts to extract a next playback number from the playback control information (S161). If the playback control information has no next playback number (S162:NO), the playback control unit 102 ends the operation.

If the playback control information has a next playback number (S162:YES), the playback control unit 102 returns to step 5156.

(4) Content Decryption and Playback Operation by the Decryption Unit 103 and the Playback Unit 107

Figure 15:
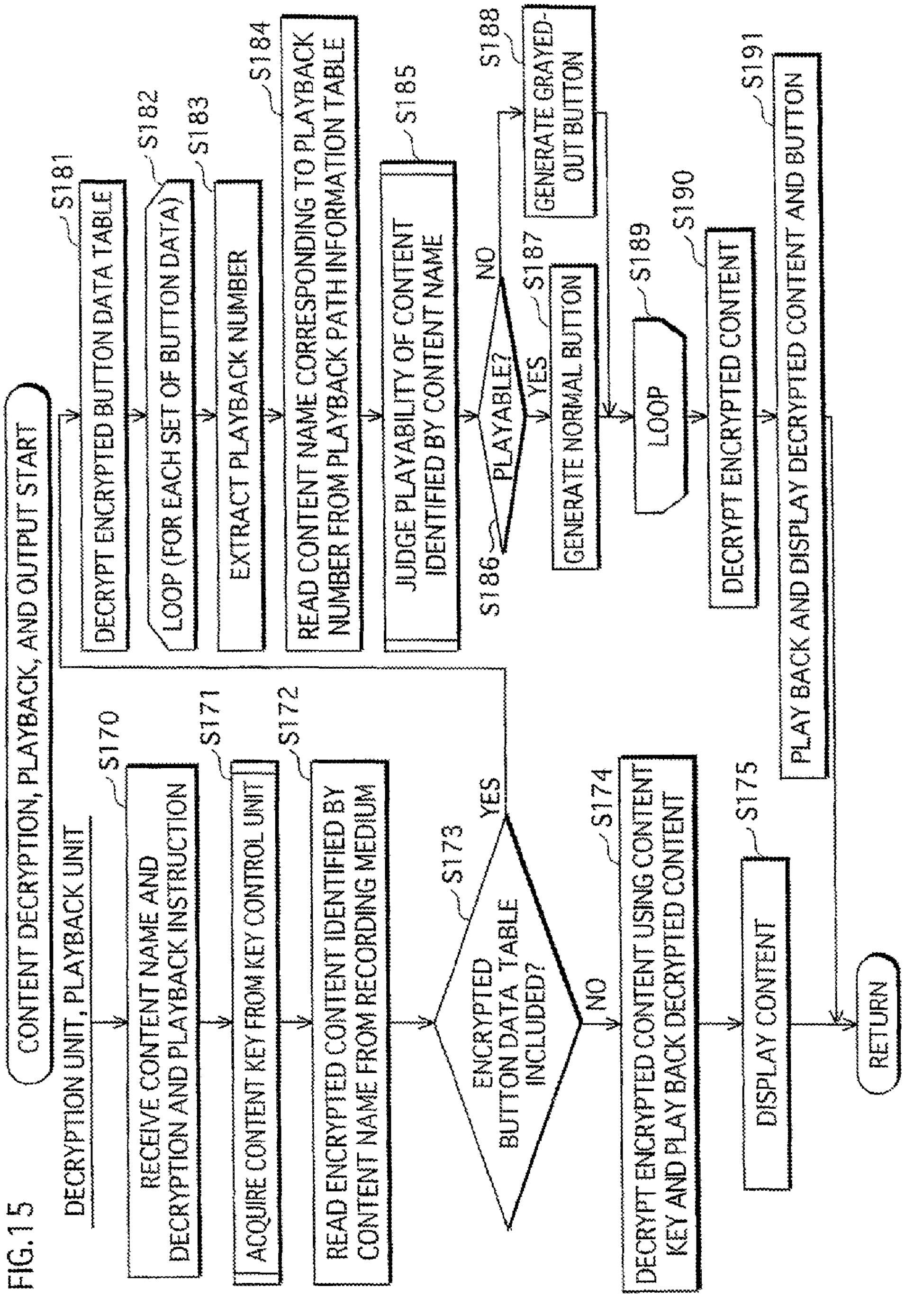
FIG. 15 is a flowchart of a content decryption and playback operation by a decryption unit and a playback unit in the playback device.

FIG. 15 is a flowchart of a content decryption and playback operation by the decryption unit 103 and the playback unit 107.

The decryption unit 103 receives a content name and a decryption and playback instruction from the playback control unit 102 (S170). The decryption unit 103 acquires a content key from the key control unit 104 (S171), and reads encrypted content identified by the received content name from the recording medium 200 (S172).

Following this, the decryption unit 103 judges whether the encrypted content contains an encrypted button data table (S173). If the encrypted content does not contain an encrypted button data table (S173:NO), the decryption unit 103 decrypts the encrypted content in units of packets using the acquired content key, and outputs the decrypted content to the playback unit 107. The playback unit 107 decodes the decrypted content to generate digital video and audio data, and generates analog video and audio signals from the digital video and audio data (S174). The display device 113 outputs the video signal as video and the audio signal as sounds (S175).

If the encrypted content contains an encrypted button data table (S173:YES), the decryption unit 103 decrypts the encrypted button data table using the acquired content key (S181). The decryption unit 103 then performs steps S183 to 5188 for each set of button data included in the decrypted button data table (S182, S189).

The decryption unit 103 extracts a playback number from the button data (S183). The decryption unit 103 reads a content name corresponding to the extracted playback number from the playback path information table 210 via the playback control unit 102 (S184), and inquires of the rights management unit 108 whether content identified by the content name is playable (S185). If the content is judged as being playable (S186:YES), the decryption unit 103 extracts unselected data and selected data that represent normal button display, from the button data (S187). If the content is judged as being unplayable (S186:NO), the decryption unit 103 extracts grayed-out data that represents grayed-out button display, from the button data (S188).

The decryption unit 103 then decrypts the encrypted content in units of packets using the content key (S190).

The decryption unit 103 outputs the decrypted content to the playback unit 107. The decryption unit 103 also outputs selected data and unselected data or grayed-out data extracted for each set of button data, to the playback unit 107. The playback unit 107 overlays the selected data and unselected data or the grayed-out data on video data to play the content on which the buttons are superimposed. The display device 113 outputs a video signal as video and an audio signal as sounds (S191).

(5) Content Key Acquisition Operation by the Key Control Unit 104

Figure 16:
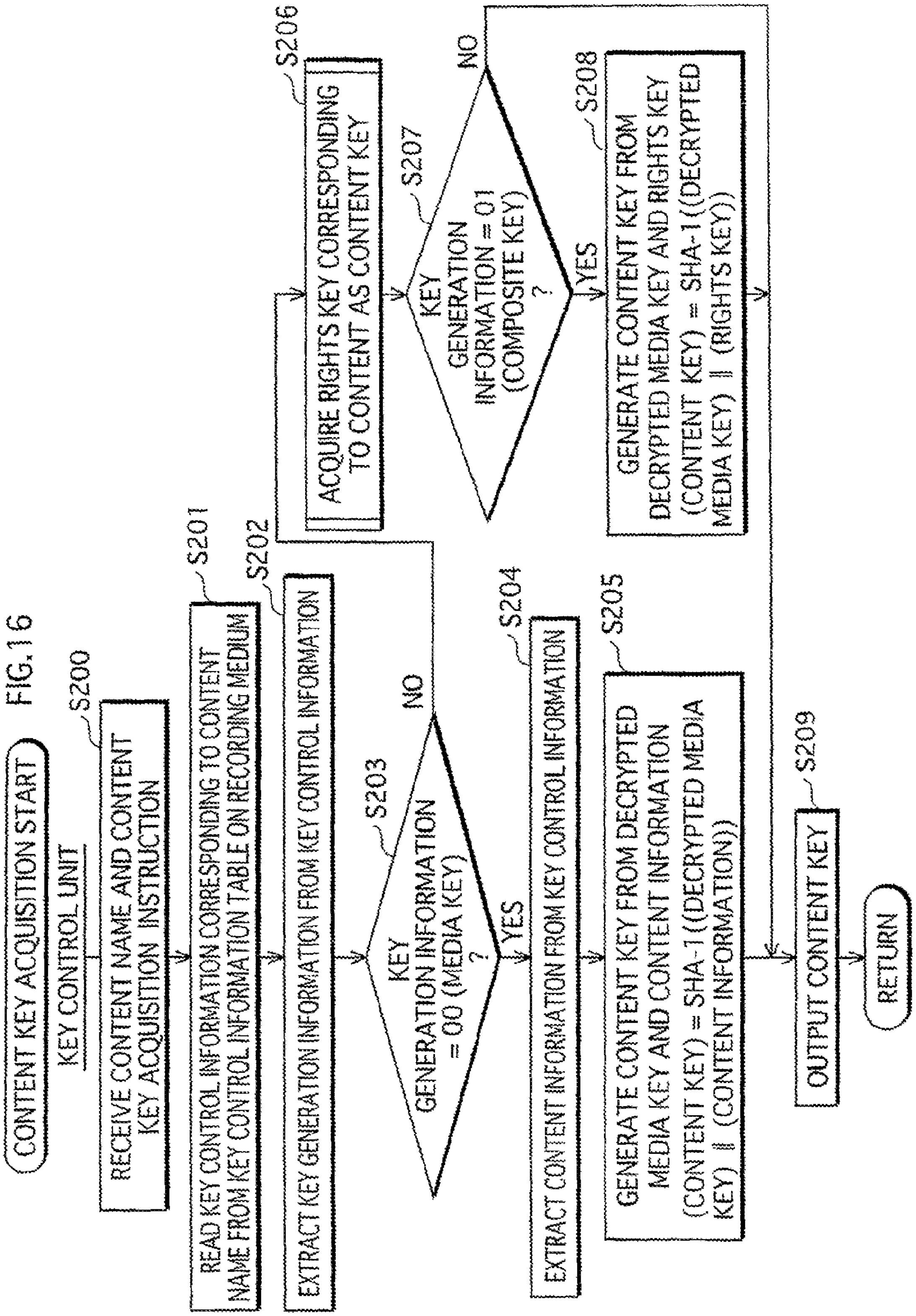
FIG. 16 is a flowchart of a content key acquisition operation by a key control unit in the playback device.

FIG. 16 is a flowchart of a content key acquisition operation by the key control unit 104.

The key control unit 104 receives a content key acquisition instruction and a content name from the decryption unit 103 (S200). The key control unit 104 reads key control information having the received content name from the key control information table 260 on the recording medium 200 (S201), and extracts key generation information from the read key control information (S202).

The key control unit 104 judges whether the key generation information is "00" or not (S203). If the key generation information is "00" (S203:YES), the key control unit 104 extracts content information from the key control information (S204), and concatenates the decrypted media key received from the media key generation unit 105 and the extracted content information in this order. The key control unit 104 applies a one-way function to the concatenation outcome to thereby generate a content key (S205), and outputs the content key to the decryption unit 103 (S209).

If the key generation information is not "00" (3203:NO), the key control unit 104 acquires a rights key corresponding to content identified by the received content name from the rights management unit 108 (S206). The key control unit 104 then judges whether the key generation information is "01" or "10" (S207). If the key generation information is "10" (S207:NO), the key control unit 104 outputs the rights key to the decryption unit 103 as the content key (S209).

If the key generation information is "01" (S207:YES), the key control unit 104 concatenates the decrypted media key and the rights key in this order, and applies a one-way function to the concatenation outcome to generate the content key (S208). The key control unit 104 outputs the content key to the decryption unit 103 (S209).

(6) Rights Key Acquisition Operation by the Rights Management Unit 108

Figure 17:
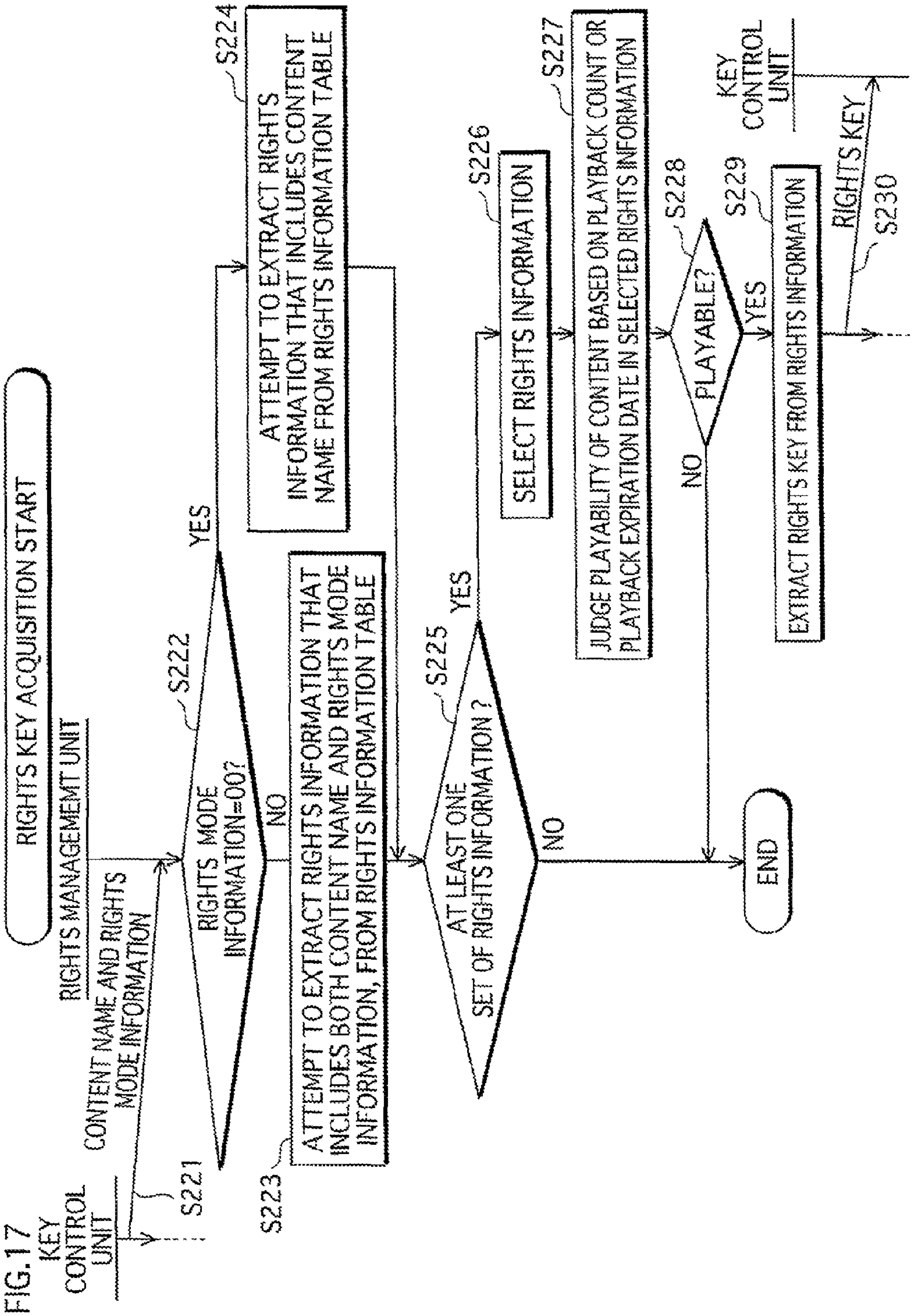
FIG. 17 is a flowchart of a rights key acquisition operation by a rights management unit in the playback device.

FIG. 17 is a flowchart of a rights key acquisition operation by the rights management unit 108.

The rights management unit 108 receives a content key and rights mode information from the key control unit 104 (S221). The rights management unit 108 judges whether the rights mode information is "00" or any of "01", "10", and "01, 10", to judge whether any rights mode is specified or not (S222).

If a rights mode is specified, that is, if the rights mode information is any of "01", "10", and "01,10" (S222:NO), the rights management unit 108 attempts to extract rights information that includes both the rights mode information and the content name from the rights information table 121 in the rights storage unit 109 (S223).

If no rights mode is specified, that is, if the rights mode information is "00" (S222:YES), the rights management unit 108 attempts to extract rights information that includes the content name from the rights information table 121 (S224).

If one or more sets of rights information are extracted as a result (S225:YES), the rights management unit 108 selects one set of rights information (S226). The rights management unit 108 then judges whether the content identified by the content name is playable, based on a playback count or a playback expiration date included in the selected rights information (S227).

If the content is judged as being playable (S228:YES), the rights management unit 108 extracts a rights key from the rights information (5229), and outputs the rights key to the key control unit 104 (S230).

If the content is judged as being unplayable (S228:NO) or if no set of rights information is extracted (S225:NO), the rights management unit 108 ends the operation.

(7) Playability Judgment Operation by the Key Control Unit 104

Figure 18:
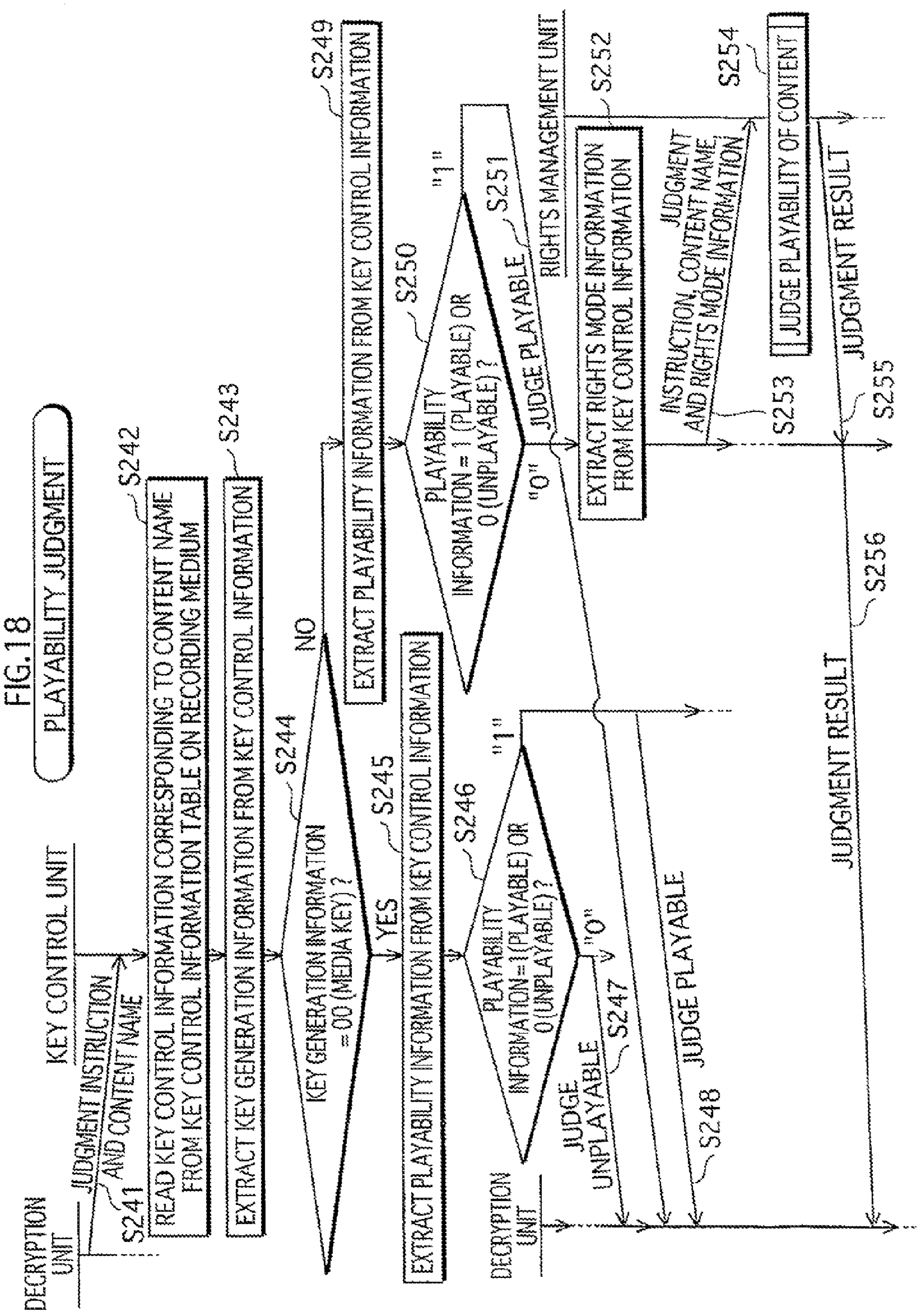
FIG. 18 is a flowchart of a playability judgment operation by the key control unit in the playback device.

FIG. 18 is a flowchart of a playability judgment operation by the key control unit 104.

The key control unit 104 receives a content name and a playability judgment instruction from the decryption unit 103 (S241). The key control unit 104 reads key control information having the received content name from the key control information table 260 on the recording medium 200 (S242), and extracts key generation information from the read key control information (S243).

The key control unit 104 judges whether the key generation information is "00" (S244). If the key generation information is "00" (S244:YES), the key control unit 104 extracts playability information from the key control information (S245), and judges whether the playability information is "0" or "1" (5246). If the playability information is "1" (S246: "1"), the key control unit 104 notifies the decryption unit 103 that content identified by the content name is playable (S248). If the playability information is "0" (S246: "0"), the key control unit 104 notifies the decryption unit 103 that the content is unplayable (S247).

If the key generation information is not "00" (S244:NO), the key control unit 104 extracts the playability information from the key control information (S249), and judges whether the playability information is "0" or "1" (S250). If the playability information is "1" (S250: "1"), the key control unit 104 notifies the decryption unit 103 that the content is playable (S251). If the playability information is "0" (S250: "0"), the key control unit 104 extracts rights mode information from the key control information (S252), and outputs a playability judgment instruction, the rights mode information, and the content name to the rights management unit 108 (S253). The rights management unit 108 judges whether the content is playable or not (S254). The key control unit 104 receives a judgment result from the rights management unit 108 (S255), and outputs the judgment result to the decryption unit 103 (S256).

(8) Playability Judgment Operation by the Rights Management Unit 108

Figure 19:
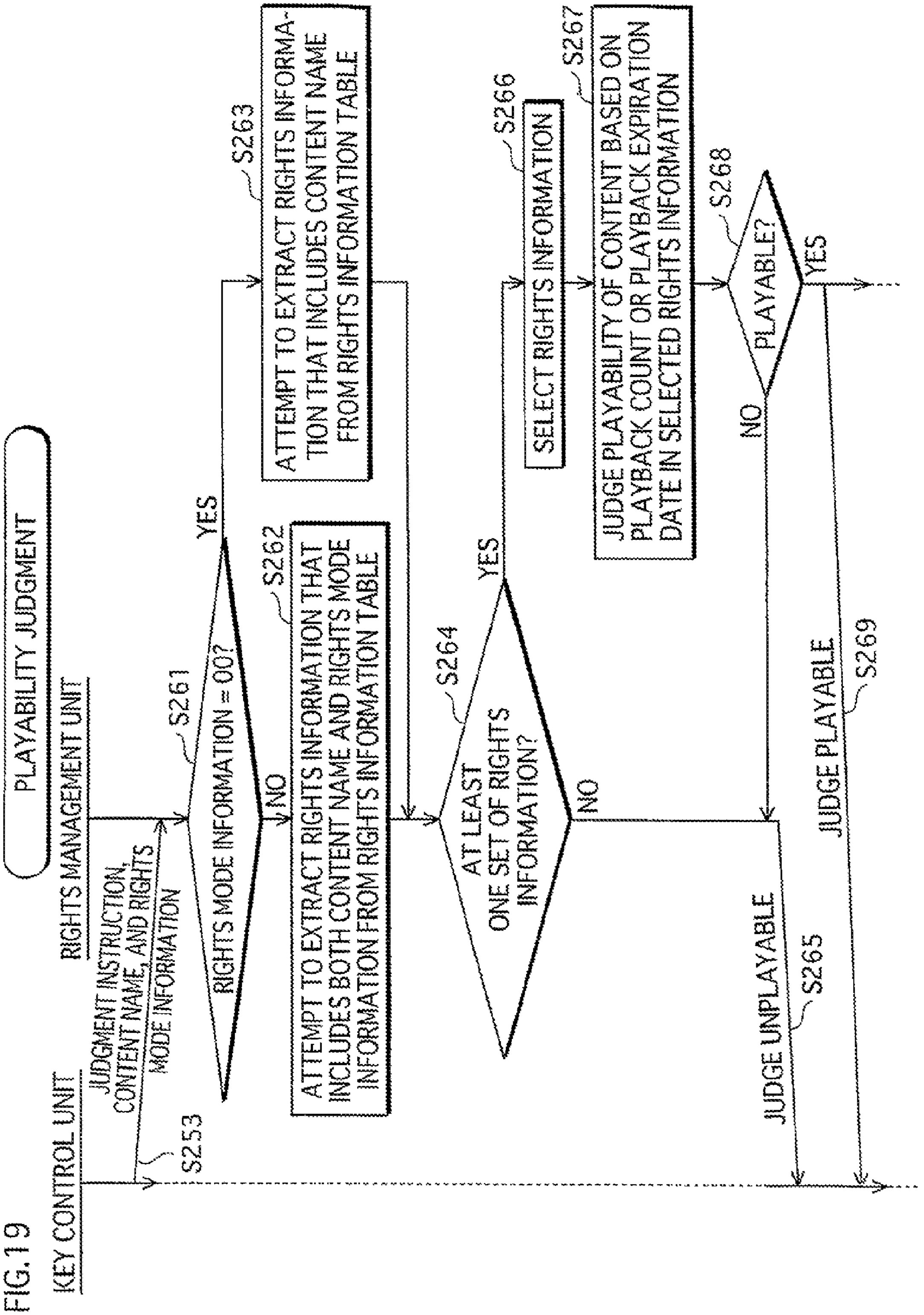
FIG. 19 is a flowchart of a playability judgment operation by the rights management unit in the playback device.

FIG. 19 is a flowchart of a playability judgment operation by the rights management unit 108.

The rights management unit 108 receives a playability judgment instruction, a content name, and rights node information from the key control unit 104 (S253), and judges whether the rights mode information is "00" or any of "01", "10", and "01,10" (S261). If the rights mode information is any of "01", "10", and "01,10", that is, if a rights mode is specified for content identified by the content name (S261:NO), the rights management unit 108 attempts to extract rights information that includes both the rights mode information and the content name from the rights information table 121 in the rights storage unit 109 (S262). If the rights mode information is "00", that is, if no rights mode is specified for the content (S261:YES), the rights management unit 108 attempts to extract rights information that includes the content name from the rights information table 121 (S263).

If one or more sets of rights information are extracted as a result (S264:YES), the rights management unit 108 selects one set of rights information (S266). The rights management unit 108 then judges whether the content is playable, based on a playback count or a playback expiration date included in the selected rights information (S267). If the content is judged as being playable (S268:YES), the rights management unit 108 notifies the key control unit 104 that the content is playable (S269).

If the content is judged as being unplayable (S268:NO), the rights management unit 108 notifies the key control unit 104 that the content is unplayable (S265).

If no set of rights information is extracted (S264:NO), the rights management unit 108 notifies the key control unit 104 that the content is unplayable (S265).

(9) Operation of Acquiring Rights Information from the License Server Device 300

Figure 20:
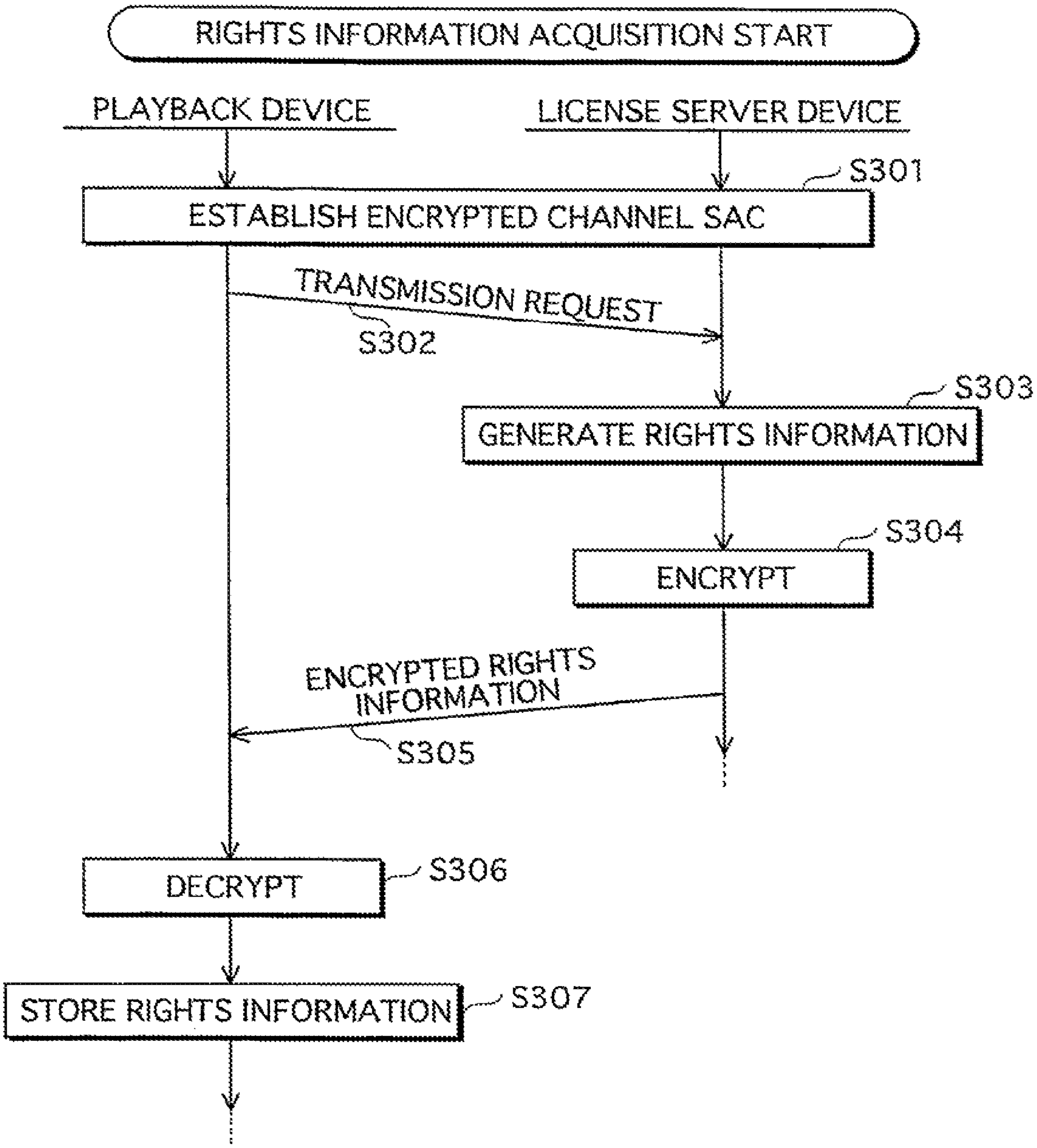
FIG. 20 is a flowchart of an operation of acquiring rights information from the license server device by the playback device.

FIG. 20 is a flowchart of an operation of acquiring rights information from the license server device 300.

The communication unit 110 in the playback device 100 establishes an encrypted channel, namely a SAC, with the communication unit 301 in the license server device 300 (S301).

The communication unit 110 then requests transmission of rights from the communication unit 301 (S302).

The rights generation unit 303 in the license server device 300 generates rights information for the playback device 100 (S303), and encrypts the generated rights information (S304). The rights generation unit 303 transmits the encrypted rights information to the playback device 100 via the communication control unit 302, the communication unit 301, and the internet 10 (S305).

The communication unit 110 decrypts the encrypted rights information (S306), and writes the decrypted rights information to the rights storage unit 109 (S307).

1.6. Modifications

Although the present invention has been described by way of the above embodiment, it should be obvious that the present invention is not limited to the above. Example modifications are given below.

(1) The above embodiment describes playback path control according to playback control information and grayed-out button display, as two examples of playback control that is exercised according to license-based content playability, though the present invention is not limited to such. For example, the following modifications (i) to (iii) are possible.

(i) The recording medium 200 may store standard-version content that can be used by purchasing the recording medium 200, and director's-cut-version content that can be used only by further purchasing special rights. In the playback path information table 210 shown in FIG. 3, the next playback number 219 designates playback control information corresponding to the director's-cut-version content, whilst the alternative playback number 220 designates playback control information corresponding to the standard-version content.

Also, the recording medium 200 may store purchase guidance content which contains an image for purchase of content, and commercial content which contains an advertising message. If the user does not have a license for the content or the playback expiration date of the content is exceeded, the purchase guidance content or the commercial content is played back mandatorily. Also, an operation of acquiring the license from the license server device 300 may be carried out mandatorily.

Furthermore, if the user does not have the license or the playback expiration date is exceeded, any of special playback, menu display, angle switching, and stream switching may be prohibited.

(ii) Playback control according to license-based content playability may be applied to angle switching in DVDs.

In more detail, the recording medium 200 stores a plurality of pieces of angle content which are subjected to angle switching. These pieces of angle content are grouped according to playback point. All pieces of angle content belonging to one angle content group are playable at one playback point and so one piece of angle content is selected and played back at that playback point. All pieces of angle content belonging to another angle content group are playable at another playback point and so one piece of angle content is selected and played back at that playback point. In the playback path information table 210 shown in FIG. 3, playback control information corresponding to angle content may include a next playback number that designates angle content to be selected next, and an alternative playback number that designates angle content to be selected if the angle content designated by the next playback number is unplayable according to license conditions or the like.

Here, the playback control information may include a plurality of next playback numbers. The playback control information may further include a plurality of alternative playback numbers corresponding to the plurality of next playback numbers.

Information about playability of angle content based on license may be stored, too. In other words, the data structures of the key control information table 260 in FIG. 8 and the rights information table 121 in FIG. 10 can be used in the case of angle switching, too. In this case, each content name in the key control information table 260 and the rights information table 121 identifies angle content.

This makes it possible to prohibit switching to an unusable angle.

This modification can be summarized as follows. A plurality of pieces of angle content which are subjected to angle switching are recorded on the recording medium 200 in advance. The playback control unit 102 in the playback device 100 receives an instruction to play angle content, and the rights management unit 108 judges whether the angle content is playable based on corresponding rights information in the rights information table 121. Depending on a judgment result of the rights management unit 108, the playback control unit 102 selects angle content to be played next, from an appropriate angle content group on the recording medium 200. The decryption unit 103 and the playback unit 107 decrypt and play the selected angle content.

(iii) Likewise, playback control according to license-based content playability may be applied to audio/subtitle stream switching. This makes it possible to prohibit switching to an unusable audio/subtitle stream. Audio/subtitle streams referred to here are auxiliary (accessory) content that is played back and output together with video content.

The recording medium 200 may store a plurality of pieces of auxiliary content which are grouped according to playback point or playback section. All pieces of auxiliary content belonging to one auxiliary content group are playable at one playback point or playback section. For example, English audio data, Japanese audio data, and Chinese audio data belong to such an auxiliary content group. At the playback point or playback section, one of these pieces of auxiliary content is selected and played back.

Also, all pieces of auxiliary content belonging to another auxiliary content group are playable at another playback point or playback section.

Suppose English audio data, Japanese audio data, and Chinese audio data are recorded on the recording medium 200 in correspondence with each piece of content, and the use of the English audio data and the Chinese audio data is permitted by license whereas the use of the Japanese audio data is not permitted by license. This being the case, the English audio data may be played back instead of the Japanese audio data.

Also, suppose English subtitle data, Japanese subtitle data, and Chinese subtitle data are recorded on the recording medium 200 in correspondence with each piece of content, and only the use of the English subtitle data is permitted by license. This being the case, the English subtitle data may be played back instead of the Japanese or Chinese subtitle data.

Which is to say, when the recording medium 200 stores a plurality of pieces of auxiliary content, playback control information corresponding to content in the playback path information table 210 includes an auxiliary number for identifying auxiliary content to be played together with the content, and an alternative auxiliary number for identifying auxiliary content to be played if the auxiliary content identified by the auxiliary number is unplayable according to license or the like.

Information about playability of auxiliary content according to license may be stored, too. In other words, the data structures of the key control information table 260 in FIG. 8 and the rights information table 121 in FIG. 10 may be applied to auxiliary content, too. In this case, each content name in the key control information table 260 and the rights information table 121 identifies auxiliary content.

This modification can be summarized as follows. A plurality of pieces of auxiliary content such as audio streams and subtitle streams are recorded on the recording medium 200. The playback control unit 102 in the playback device 100 receives an instruction to play auxiliary content. The rights management unit 108 judges whether the auxiliary content is playable, based on corresponding rights information in the rights information table 121. Depending on a judgment result of the rights management unit 108, the playback control unit 108 selects auxiliary content to be played next, from an appropriate auxiliary content group on the recording medium 200. The decryption unit 103 and the playback unit 107 decrypt and play back the selected auxiliary content.

(2) The above embodiment describes the case where the key control information table 260 shown in FIG. 8 is stored on the recording medium 200 in unencrypted form, but this is not a limit for the present invention. To prevent unauthorized playback or copying by tampering with playability information or copyability information in the key control information table 260, the key control information table 260 may be encrypted or the like. In this case, it is effective to encrypt the key control information table 260 using the media key. Hence the playability information and the copyability information in the key control information table 260 can be protected from tampering.

(3) The above embodiment describes an example of playing back content recorded on the recording medium 200, but the same method can be used when copying the content recorded on the recording medium 200.

Which is to say, when the user requests copying of the content recorded on the recording medium 200, a recording device which has the same construction as the playback device 100 acquires a decrypted media key in the same way as in FIG. 13. The recording device then judges the copyability of the content in the same way as in FIG. 14, and copies the content to another recording medium if judged as being copyable.

(4) A content recording/playback system 1*b* is explained below, as a modification to the above embodiment.

Figure 21:
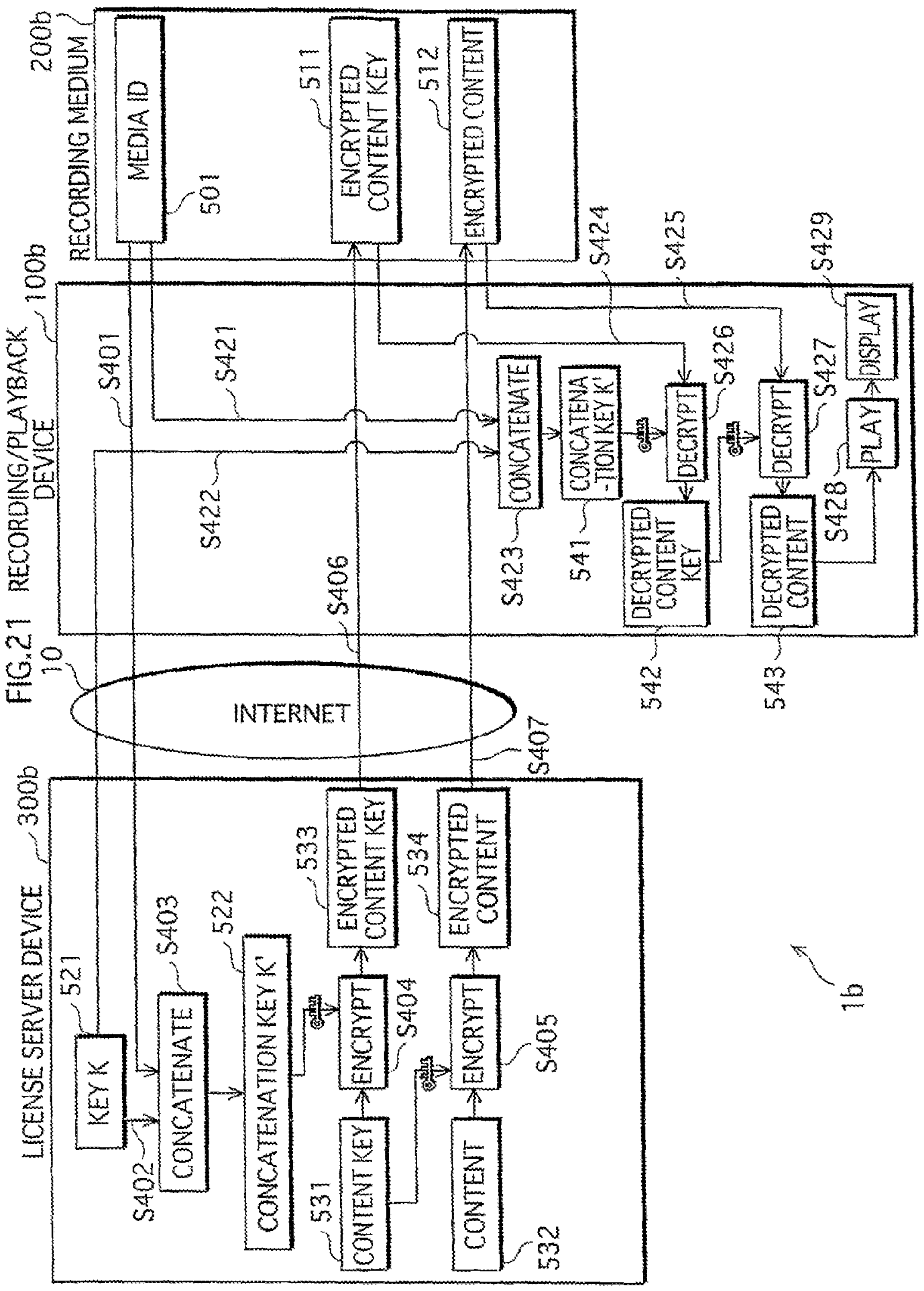
FIG. 21 shows an overall construction of a content recording/playback system which is a modification to the embodiment.

FIG. 21 shows a construction of the content recording/playback system 1*b*. In the drawing, the content recording/playback system 1*b* is roughly made up of a recording/playback device 100*b* and a license server device 300*b*, which are connected via the internet 10. Also, a recording medium 200*b* is connected to the recording/playback device 100*b* by the user.

The recording medium 200*b* stores a media ID 501 unique to the recording medium 200*b*, beforehand.

The license server device 300*b* stores a key K 521, a content key 531, and content 532 beforehand.

The license server device 300*b* acquires the media ID 501 from the recording medium 200*b*, via the recording/playback device 100*b* and the internet 10 (S401). The license server device 300*b* reads the key K 521 (S402), and concatenates the media ID 501 and the key K 521 in this order to generate a concatenation key K' 522 (S403).

The license server device 300*b* then reads the content key 531, and applies an encryption algorithm to the content key 531 using the concatenation key K' 522 to generate an encrypted content key 533 (S404). The license server device 300*b* writes the encrypted content key 533 to the recording medium 200*b* via the internet 10 and the recording/playback device 100*b*, as an encrypted content key 511 (S406). The license server device 300*b* also reads the content 532, and applies an encryption algorithm to the content 532 using the content key 531 to generate encrypted content 534 (S405). The license server device 300*b* writes the encrypted content 534 to the recording medium 200*b* via the internet 10 and the recording/playback device 100*b*, as encrypted content 512 (S407).

After this, the recording/playback device 100*b* reads the media ID 501 from the recording medium 200*b* (S421), and acquires the key K 521 from the license server device 300*b* via the internet 10 (S422). The recording/playback device 100*b* concatenates the media ID 501 and the key K 521 in this order to generate a concatenation key K' 541 (S423). The recording/playback device 100*b* reads the encrypted content key 511 from the recording medium 200*b* (S424), and applies a decryption algorithm to the encrypted content key 511 using the concatenation key K' 541 to generate a decrypted content key 542 (S426). The recording/playback device 100*b* also reads the encrypted content 512 from the recording medium 200*b* (S425), and applies a decryption algorithm to the encrypted content 512 using the decrypted content key 542 to generate decrypted content 543 (S427). The recording/playback device 100*b* plays back the decrypted content 543 (S428), and displays it (S429).

In this content recording/playback system 1*b*, the recording/playback device 100*b* writes the encrypted content key 511 and the encrypted content 512 to the recording medium 200*b* and reads the encrypted content key 511 and the encrypted content 512 from the recording medium 200*b*. However, the present invention is not limited to this.

For example, the content recording/playback system 1*b* may include a recording device and a playback device, instead of the recording/playback device 100*b*. In this case, the recording device writes the encrypted content key and the encrypted content output from the license server device 300*b* to the recording medium 200*b*, and the playback device reads the encrypted content key and the encrypted content from the recording medium 200*b* and plays back the encrypted content.

(5) The above embodiment describes the case where if content is judged as being unplayable, the same playback control is uniformly exercised regardless of why the content is unplayable. This can be modified as follows.

For instance, different playback control may be performed depending on whether the user does not have a license for content or a playback expiration date of the content is exceeded. If the user does not have the license, content shown by an alternative playback number is played back, as in the above embodiment. If the playback expiration date is exceeded, on the other hand, the original content is played back while displaying a message indicating that the playback expiration date is exceeded, or alternatively, purchase guidance content is played back Also, playback control information in the playback path information table 210 may include a next playback number, a first alternative playback number, and a second alternative playback number. As one example, the first alternative playback number designates playback control information to be used when the user does not have the license, whilst the second alternative playback number designates playback control information to be used when the playback expiration date is exceeded. In this case, the playback control unit 102 uses the next playback number if the playback of the content is permitted by license, the first alternative playback number if the user does not have the license, and the second alternative playback number if the playback expiration date is exceeded.

Which is to say, the playback path information table 210 shown in FIG. 3 includes both the first alternative playback number and the second alternative playback number, so that the playback control unit 102 uses an appropriate alternative playback number depending on why the content is unplayable.

The playback control information may further include a third alternative playback number, a fourth alternative playback number, . . . . The playback control unit 102 selects an appropriate alternative playback number depending on license conditions.

Also, the rights management unit 108, the rights storage unit 109, and the communication unit 110 in the playback device 100 may be realized by a removable device such as a card. In this case, if the removable device is not connected to the playback device 100, an inquiry made to the rights management unit 108 will end up being a failure. Different playback control may be exercised in such a case.

(6) The above embodiment describes the case where only the playability of content is judged in the content key acquisition operation and the rights key acquisition operation, but this is not a limit for the present invention.

For example, key control information in the key control information table 260 shown in FIG. 8 and rights information in the rights information table 121 shown in FIG. 10 may include playback quality information about a playback quality of a video or audio stream, in addition to playability information.

Such information may be used in the content key acquisition operation and the rights key acquisition information, as follows. The key control unit 104 writes playback quality information included in rights information over playback quality information included in corresponding key control information, to prioritize the former playback quality information over the latter playback quality information. The key control unit 104 outputs the written playback quality information to the playback unit 107 via the decryption unit 103, and the playback unit 107 plays back the content with a playback quality shown by the received playback quality information.

This makes it possible to have the playback unit 107 down-convert content from HD to SD or QCIF (Quarter Common Intermediate Format) and plays back the content.

(7) The above embodiment describes the case where rights information in the rights information table 121 shown in FIG. 10 includes rights mode information. According to this construction, however, there is a danger that the rights mode information may be tampered with. Different rights modes are usually managed by different companies, with there being a possibility that a malicious company may conduct an unauthorized act against another company.

This problem can be avoided by digitally signing rights information which includes rights mode information and other data, attaching the resulting signature data to the rights information and other data, and including them into a certificate of a signer.

For instance, such a certificate includes a serial number of the certificate, the rights information including the rights mode information, an identification code of the signer, a signed date, an expiration date of the certificate, and the signature data. The signature data is created by digitally signing the serial number, the rights information, the identification code, the signed date, and the expiration date using a private key of the signer.

To use the rights information, the playback device 100 obtains a public key of the signer, and verifies the signature data and other data included in the certificate using the obtained public key to judge whether the rights information has been tampered with. Only if the rights information has not been tampered with, the playback device 100 proceeds to use the rights information.

Also, the key control unit 104 and the rights management unit 108 in the playback device 100 may perform mutual authentication using a SAC. If the mutual authentication has failed, the key control unit 104 and the rights management unit 108 terminate the subsequent information transfer. If the mutual authentication has succeeded, the key control unit 104 and the rights management unit 108 perform the subsequent information transfer. Here, the key control unit 104 and the rights management unit 108 may each be realized by a discrete, removable module independent of the playback device 100.

In such a case, the key control unit 104 may extract the rights mode information from the certificate received during the mutual authentication, and check whether the extracted rights mode information matches rights mode information included in corresponding key control information.

When performing the mutual authentication, a CRL (Certificate Revocation List) showing information for identifying invalid modules may be stored in each of the recording medium 200 and the rights storage unit 109. Such a CRL allows each of the key control unit 104 and the rights management unit 108 to avoid an invalid module.

As an alternative, the key control unit 104 may hold a first module identifier for identifying an invalid module. In this case, the key control unit 104 acquires an identifier for identifying the rights management unit 108, and judges whether the acquired identifier matches the first module identifier. If they match, the key control unit 104 refuses to conduct information transfer with the rights management unit 108.

Also, the recording medium 200 may store a second module identifier for identifying an invalid module. In this case, the rights management unit 108 reads the second module identifier from the recording medium 200, acquires an identifier for identifying the key control unit 104, and judges whether the acquired identifier matches the second module identifier. If they match, the rights management unit 108 refuses to conduct information transfer with the key control unit 104.

(8) The above embodiment describes the case where content is unconditionally judged as being unplayable if key control information corresponding to the content includes key generation information which shows “media key” and playability information which shows “unplayable”. However, the present invention is not limited to this. Even when the key generation information shows “media key” and the playability information shows “unplayable”, the key control unit 104 may further inquire of the rights management unit 108 whether the content is playable or not.

(9) The above embodiment describes the case where the key control information table 260 is stored on the recording medium 200 separately from encrypted content, but this is not a limit for the present invention.

For example, key control information may be multiplexed with encrypted content that is identified by a content name included in the key control information. This clarifies the correspondence between the key control information and the encrypted content, thereby making it unnecessary to include the content name in the key control information. The playback device 100 can acquire the key control information by separating it from the encrypted content.

Also, the key control information table 260 may be stored on a recording medium different from the recording medium 200. Alternatively, the key control information table 260 may be acquired via a network. This is particularly effective in the case where not all pieces of content are recorded on one package medium but additional content is separately acquired from a network and recorded on an HDD.

(10) The above embodiment describes the case where rights information in the rights information table 121 shown in FIG. 10 includes a content name which shows a filename of content, but the present invention is not limited to this.

As one example, the rights information (also referred to as contract information) includes a rights identifier (also referred to as a license identifier or a contract identifier) for identifying the rights information, with the rights identifier being also included in corresponding key control information in the key control information table 260 shown in FIG. 8. Based on this rights identifier, the rights management unit 108 searches for the rights information.

The rights identifier may also be included in corresponding playback control information in the playback path information table 210 shown in FIG. 3. Through the use of the rights identifier, the playback control unit 102 can inquire of the rights management unit 108, via the decryption unit 103 and the key control unit 104, whether the content is playable or not, and use a judgment result of the rights management unit 108.

As can be seen from FIG. 3, the playback control information includes a content name, i.e., a content identifier for identifying the content. Accordingly, the recording medium 200 may store a correspondence table of content identifiers and rights identifiers. The playback control unit 102 extracts the content identifier from the playback control information, reads the rights identifier corresponding to the extracted content identifier from the correspondence table, and uses the rights identifier to inquire of the rights management unit 108, via the decryption unit 103 and the key control unit 104, whether the content is playable or not.

(11) The above embodiment describes the case where rights information is acquired from the license server device 300, but the present invention is not limited to this. For instance, the rights information table 121 may be stored on the recording medium 200, so that the playback device 100 reads the rights information table 121 from the recording medium 200. Alternatively, the rights information table 121 may be stored on another recording medium, so that the playback device 100 reads the rights information table 121 from the other recording medium.

(12) The above embodiment describes the case where the functions of the playback control unit 102, the decryption unit 103, the key control unit 104, the media key generation unit 105, and the rights management unit 108 in the playback device 100 can be achieved by the CPU operating in accordance with the computer programs, though this is not a limit for the present invention. For instance, each of the playback control unit 102, the decryption unit 103, the key control unit 104, the media key generation unit 105, and the rights management unit 108 may be realized by separate hardware.

(13) The above embodiment describes a BD as one example of the recording medium 200. The BD has a file system such as a UDF (Universal Disk Format), so that the information recorded on the recording medium 200 shown in FIG. 2 is typically treated as one or more files on the file system. However, this is not a limit for the present invention.

For instance, the media information table 280 may be stored in a specific area of a lead-in area of the BD or in a user data area of the BD. Alternatively, the media information table 280 may be stored in a BCA (Burst Cutting Area). Also, the media key may be generated as follows. An error intentionally created for error detecting code is set as a first media key. Meanwhile, a second media key is encrypted using device information of each playback device and stored in the media information table 280 that is written in the lead-in area or the user data area. The media key is calculated by applying a one-way function or the like to the first and second media keys.

Also, identification information unique to the recording medium 200, which is stored in the BCA, may be used as the media key of the recording medium 200. As an alternative, identification information unique to a title, which is stored in the lead-in area or the user data area, may be used as the media key of the recording medium 200. Further, a random value stored in the user data area may be used as the media key of the recording medium 200.

Also, an MKB (Media Key Block) stored in the lead-in area or the user data area may be used as information unique to the recording medium 200.

(14) The above embodiment describes the case where rights mode information included in key control information in the key control information table 260 shown in FIG. 8 specifies one or more rights modes specified for corresponding content when key generation information in the key control information is “10” (rights key) or “01” (composite key). Meanwhile, the rights mode information does not specify any rights mode with the value “00”, if the key generation information is “00” (media key). This, however, is not a limit for the present invention.

As one example, the rights mode information “00” indicates a rights mode that depends on a recording medium, whereas the rights mode information “10” or “01” indicates a rights mode that depends on a license. If the rights mode information is “00”, the playback device 100 uses a media key to generate a content key. If the rights mode information is “10” or “01”, the playback device 100 uses a rights key or a composite key to generate the content key.

(15) The present invention relates to a terminal for playing back a medium that stores encrypted content, usability of which is determined according to a license, and playback control information for the encrypted content. The terminal includes a usability inquiry unit, a playback control unit, a license key acquisition unit, and a decryption unit. The usability inquiry unit inquires whether the encrypted content is permitted to be used according to the license. The playback control unit controls playback based on a result of the inquiry by the usability inquiry unit and the playback control information. The license key acquisition unit acquires a license key from the license. The decryption unit decrypts the encrypted content using the license key acquired by the license key acquisition unit.

Also, the present invention relates to a terminal for playing back a medium that stores encrypted content, usability of which is determined according to a license, and playback control information for the encrypted content. The playback control information referred to here includes at least playback path information for the encrypted content. The terminal includes a usability inquiry unit, a playback control unit, a license key acquisition unit, and a decryption unit. The usability inquiry unit inquires whether the encrypted content is permitted to be used according to the license. The playback control unit controls a playback path based on a result of the inquiry by the usability inquiry unit and the playback control information. The license key acquisition unit acquires a license key from the license. The decryption unit decrypts the encrypted content using the license key acquired by the license key acquisition unit.

Here, the playback control information may include a content identifier for identifying the encrypted content. Through the use of this content identifier, the usability inquiry unit and/or the license key acquisition unit can perform the inquiry and/or the license key acquisition.

Here, the playback control information may include a license identifier for identifying the license. Through the use of this license identifier, the usability inquiry unit and/or the license key acquisition unit can perform the inquiry and/or the license key acquisition.

Also, the present invention relates to a method for playing back a medium that stores encrypted content, usability of which is determined according to a license, and playback control information for the encrypted content. The method includes a usability inquiry step, a playback control step, a license key acquisition step, and a decryption step. The usability inquiry step inquires whether the encrypted content is permitted to be used according to the license. The playback control step controls playback based on a result of the inquiry by the usability inquiry step and the playback control information. The license key acquisition step acquires a license key from the license. The decryption step decrypts the encrypted content using the license key acquired by the license key acquisition step.

Also, the present invention relates to a method for playing back a medium that stores encrypted content, usability of which is determined according to a license, and playback control information for the encrypted content. The playback control information referred to here includes at least playback path information for the encrypted content. The method includes a usability inquiry step, a playback control step, a license key acquisition step, and a decryption step. The usability inquiry step inquires whether the encrypted content is permitted to be used according to the license. The playback control step controls a playback path based on a result of the inquiry by the usability inquiry step and the playback control information. The license key acquisition step acquires a license key from the license. The decryption step decrypts the encrypted content using the license key acquired by the license key acquisition step.

(16) The present invention relates to a terminal for playing back a medium on which encrypted content and a media key unique to the medium are stored. The terminal includes a license acquisition unit, a license key acquisition unit, a key generation unit, and a decryption unit. The license acquisition unit acquires a license including at least a key for decrypting the encrypted content. The license key acquisition unit acquires a license key from the license. The key generation unit generates a content key from the media key and the license key. The decryption unit decrypts the encrypted content using the content key.

Also, the present invention relates to a terminal for playing back a medium on which encrypted content and a media key unique to the medium are stored. The terminal includes a license acquisition unit, a license key acquisition unit, a key generation unit, a usability judgment unit, and a decryption unit. The license acquisition unit acquires a license including at least a key for decrypting the encrypted content and a use condition of the encrypted content. The license key acquisition unit acquires a license key from the license. The key generation unit generates a content key from the media key and the license key. The usability judgment unit judges whether the encrypted content corresponding to the license is permitted to be used, based on the use condition. The decryption unit decrypts the encrypted content using the content key, if the encrypted content is judged as being permitted to be used.

Also, the present invention relates to a terminal for playing back a medium on which encrypted content, a media key unique to the medium, and processing control information are stored. The terminal includes a license acquisition unit, a license key acquisition unit, a key generation unit, a key judgment unit, and a decryption unit. The license acquisition unit acquires a license including at least a key for decrypting the encrypted content. The license key acquisition unit acquires a license key from the license. The key generation unit generates a content key from the media key and the license key. The key judgment unit judges whether the license key or the content key is to be used for decrypting the encrypted content, based on the processing control information. The decryption unit decrypts the encrypted content using the key determined by the key judgment unit.

Here, the processing control information may include a content identifier for identifying the encrypted content, and key type information showing whether the license key or the content key is to be used.

Here, the processing control information may be multiplexed with the encrypted content.

Also, the present invention relates to a method for playing back a medium on which encrypted content and a media key unique to the medium are stored. The method includes a license acquisition step, a license key acquisition step, a key generation step, and a decryption step. The license acquisition step acquires a license including at least a key for decrypting the encrypted content. The license key acquisition step acquires a license key from the license. The key generation step generates a content key from the media key and the license key. The decryption step decrypts the encrypted content using the content key.

Also, the present invention relates to a method for playing back a medium on which encrypted content and a media key unique to the medium are stored. The method includes a license acquisition step, a license key acquisition step, a key generation step, a usability judgment step, and a decryption step. The license acquisition step acquires a license including at least a key for decrypting the encrypted content and a use condition of the encrypted content. The license key acquisition step acquires a license key from the license. The key generation step generates a content key from the media key and the license key. The usability judgment step judges whether the encrypted content corresponding to the license is permitted to be used, based on the use condition. The decryption step decrypts the encrypted content using the content key, if the encrypted content is judged as being permitted to be used.

Also, the present invention relates to a method for playing back a medium on which encrypted content, a media key unique to the medium, and processing control information are stored. The method includes a license acquisition step, a license key acquisition step, a key generation step, a key judgment step, and a decryption step. The license acquisition step acquires a license including at least a key for decrypting the encrypted content. The license key acquisition step acquires a license key from the license. The key generation step generates a content key from the media key and the license key. The key judgment step judges whether the media key or the content key is to be used for decrypting the encrypted content, based on the processing control information. The decryption step decrypts the encrypted content using the key determined by the key judgment step.

(17) The present invention relates to a terminal for playing back a medium on which encrypted content and a media key unique to the medium are stored. The terminal includes a license acquisition unit, a content key acquisition unit, a key selection unit, and a decryption unit. The license acquisition unit acquires a license including at least a key for decrypting the encrypted content. The content key acquisition unit acquires a content key from the license. The key selection unit selects one of the media key and the content key for decrypting the encrypted content. The decryption unit decrypts the encrypted content using the key selected by the key selection unit.

Also, the present invention relates to a terminal for playing back a medium on which encrypted content, a media key unique to the medium, and key selection information are stored. The terminal includes a license acquisition unit, a content key acquisition unit, a key selection unit, and a decryption unit. The license acquisition unit acquires a license including at least a key for decrypting the encrypted content. The content key acquisition unit acquires a content key from the license. The key selection unit selects one of the media key and the content key for decrypting the encrypted content, based on the key selection information. The decryption unit decrypts the encrypted content using the key selected by the key selection unit.

Also, the present invention relates to a terminal for playing back a medium on which encrypted content, a media key unique to the medium, and key selection information are stored. The terminal includes a license acquisition unit, a content key acquisition unit, a key selection unit, a usability judgment unit, and a decryption unit. The license acquisition unit acquires a license including at least a key for decrypting the encrypted content and a use condition of the encrypted content. The content key acquisition unit acquires a content key from the license. The key selection unit selects one of the media key and the content key for decrypting the encrypted content, based on the key selection information. The usability judgment unit judges whether the encrypted content corresponding to the license is permitted to be used, based on the use condition. The decryption unit decrypts the encrypted content using the key selected by the key selection unit, if the encrypted content is judged as being permitted to be used.

Here, the key selection information may include a content identifier for identifying the encrypted content, and key type information showing whether the media key or the content key is to be used.

Here, the key selection information may be multiplexed with the encrypted content.

Here, the key selection information may include a license identifier for identifying the license corresponding to the encrypted content, so that the content key acquisition unit can acquire the content key from the license identified by the license identifier.

Also, the present invention relates to a method for playing back a medium on which encrypted content and a media key unique to the medium are stored. The method includes a license acquisition step, a content key acquisition step, a key selection step, and a decryption step. The license acquisition step acquires a license including at least a key for decrypting the encrypted content. The content key acquisition step acquires a content key from the license. The key selection step selects one of the media key and the content key for decrypting the encrypted content. The decryption step decrypts the encrypted content using the key selected by the key selection step.

Also, the present invention relates to a method for playing back a medium on which encrypted content, a media key unique to the medium, and key selection information are stored. The method includes a license acquisition step, a content key acquisition step, a key selection step, and a decryption step. The license acquisition step acquires a license including at least a key for decrypting the encrypted content. The content key acquisition step acquires a content key from the license. The key selection step selects one of the media key and the content key for decrypting the encrypted content, based on the key selection information. The decryption step decrypts the encrypted content using the key selected by the key selection step.

Also, the present invention relates to a method for playing back a medium on which encrypted content, a media key unique to the medium, and key selection information are stored. The method includes a license acquisition step, a content key acquisition step, a key selection step, a usability judgment step, and a decryption step. The license acquisition step acquires a license including at least a key for decrypting the encrypted content and a use condition of the encrypted content. The content key acquisition step acquires a content key from the license. The key selection step selects one of the media key and the content key for decrypting the encrypted content, based on the key selection information. The usability judgment step judges whether the encrypted content corresponding to the license is permitted to be used, based on the use condition. The decryption step decrypts the encrypted content using the key selected by the key selection step, if the encrypted content is judged as being permitted to be used.

Also, the present invention relates to a medium storing encrypted content. The medium also stores a media key unique to the medium, and key selection information showing whether the encrypted content has been generated by performing encryption using the media key or not.

Here, the key selection information may includes a content identifier for identifying the encrypted content.

Here, the key selection information may include a license identifier for identifying a license for the encrypted content.

(18) The above embodiment describes the case where one key control information table is stored on the recording medium 200. However, a plurality of key control information tables may be stored on the recording medium 200.

If the recording medium 200 is a recordable or rewritable medium, the user can add encrypted content to the recording medium 200 which he or she acquired. When adding the encrypted content, a key control information table corresponding to the added content may need to be stored as well.

In this case, the key control unit 104 searches the plurality of key control information tables on the recording medium 200, for a key control information table that designates encrypted content which is to be judged as being playable or not. Here, more than one key control information table may designate the encrypted content. In such a case, the key control unit 104 detects the key control information table to be referenced, according to such a rule that prioritizes a last-stored key control information table.

Further, composite content may be distributed among a plurality of recording media. Especially when the recording medium 200 is a non-recordable medium, encrypted content that is added later needs to be recorded to another recording medium. A typical example of the other recording medium is an HDD equipped in the playback device 100. The playback device 100 records the additional encrypted content to the HDD. In this case too, the key control unit 104 searches a plurality of key control information tables on the plurality of recording media that store different parts of the composite content which are related to each other by links, for a key control information table that is to be referenced.

(19) The construction elements of each of the above devices may be partially or entirely implemented by a single system LSI. The system LSI is an ultra-multifunctional LSI manufactured by integrating multiple components on a single chip, and is actually realized by a computer system that includes a microprocessor, a ROM, and a RAM. A computer program is stored on the RAM. Functions of the system LSI can be achieved by the microprocessor operating in accordance with this computer program.

(20) The construction elements of each of the above devices may be partially or entirely implemented by a removable IC card or a discrete module. The IC card or module referred to here is a computer system that includes a microprocessor, a ROM, and a RAM. The IC card or module may contain the aforementioned ultra-multifunctional LSI. Functions of the IC card or module can be achieved by the microprocessor operating in accordance with the computer program. Here, the IC card or module may be tamper-resistant.

(21) Each of the above devices is actually a computer system that includes a microprocessor, a ROM, and a RAM. A computer program is stored on the RAM. The functions of each device can be achieved by the microprocessor operating in accordance with this computer program. This computer program is constituted by a plurality of sets of instruction code for a computer to realize the predetermined functions.

(22) The present invention also applies to the method described above. This method may be realized by a computer program that is executed by a computer. Such a computer program may be distributed as a digital signal.

The present invention may be realized by a computer-readable storage medium, such as a flexible disk, a hard disk, a CD-ROM, an MO, a DVD, a DVD-ROM, a DVD-RAM, a BD, or a semiconductor memory, on which the above computer program or digital signal is recorded. Conversely, the present invention may also be realized by the computer program or digital signal that is recorded on such a storage medium.

The computer program or digital signal that achieves the present invention may also be transmitted via a network, such as an electronic communications network, a wired or wireless communications network, or an internet, or via data broadcasting.

The present invention can also be realized by a computer system that includes a microprocessor and a memory. In this case, the computer program can be stored in the memory, with the microprocessor operating in accordance with this computer program.

The computer program or digital signal may be provided to an independent computer system by distributing a storage medium on which the computer program or digital signal is recorded, or by transmitting the computer program or digital signal via a network. The independent computer system may then execute the computer program or digital signal to function as the present invention.

(23) The above embodiment and modifications may be freely combined.

(24) A playback device and playback method for encrypted content and a recording medium on which data used by the above playback device and playback method is stored, to which the present invention relates, are suitable for use in content playback of media which contain both conventional copy-protected content and DRM content, and are therefore useful in such fields as package media and content distribution.

Industrial Applicability

The devices and recording medium to which the present invention relates can be used recurrently and continuously in a content delivery industry that produces and delivers content. Also, the devices to which the present invention relates can be manufactured and sold recurrently and continuously in an electrical product manufacturing industry.

The invention claimed is:

1. A content use device for using composite content recorded on a recording medium, the composite content including a plurality of pieces of content that are respectively protected by a plurality of different protection methods, the content use device comprising:

an acquisition unit operable to acquire a designation of one of the plurality of pieces of content;

a judgment unit operable to judge whether the designated piece of content is usable, based on contract information relating to use of the designated piece of content;

a determination unit operable to determine, if one of the plurality of pieces of content is selected according to a result of the judgment by the judgment unit, one protection method that corresponds to the selected one piece of content from among the plurality of different protection methods;

a decryption unit operable to decrypt the selected one piece of content based on the determined protection method; and an output unit operable to output the decrypted piece of content.

2. The content use device of claim 1, wherein if the designated piece of content is judged as being usable and selected, the determination unit determines the protection method corresponding to the designated piece of content, and if the designated piece of content is judged as being not usable and an alternative piece of content is selected instead of the designated piece of content, the determination unit determines one protection method that corresponds to the selected alternative piece of content from among the plurality of different protection methods, the alternative piece of content being included in the composite content in correspondence with the designated piece of content.

3. The content use device of claim 2, wherein the composite content recorded on the recording medium includes a content identifier for identifying the designated piece of content and an alternative content identifier for identifying the alternative piece of content, in correspondence with each other, if the designated piece is judged as being usable and selected by extracting the content identifier from the composite content, the determination unit determines the protection method corresponding to the selected piece of content, and if the designated piece is judged as being not usable and the alternative piece of content is selected by extracting the alternative content identifier corresponding to the content identifier from the composite content, the determination unit determines the protection method corresponding to the alternative piece of content, the decryption unit decrypts the piece of content identified by the content identifier or alternative content identifier, and the output unit outputs the decrypted piece of content.

4. The content use device of claim 1, wherein the judgment unit acquires the contract information, and judges whether the designated piece of content is usable based on the acquired contract information.

5. The content use device of claim 4, wherein the composite content recorded on the recording medium includes a license identifier for identifying the contract information, and the judgment unit includes:

a contract information storage unit operable to prestore the license identifier and the contract information in correspondence with each other;

an identifier extraction unit operable to extract the license identifier from the composite content; and a judging unit operable to read the contract information corresponding to the extracted license identifier from the contract information storage unit, and judge whether the designated piece of content is usable based on the read contract information.

6. The content use device of claim 4, wherein the composite content recorded on the recording medium includes a content identifier for identifying the designated piece of content and a license identifier for identifying the contract information, in correspondence with each other, and the judgment unit includes:

a contract information storage unit operable to prestore the license identifier and the contract information in correspondence with each other;

an identifier extraction unit operable to extract the license identifier corresponding to the content identifier for identifying the designated piece of content, from the composite content; and a judging unit operable to read the contract information corresponding to the extracted license identifier from the contract information storage unit, and judge whether the designated piece of content is usable based on the read contract information.

7. The content use device of claim 4, wherein the composite content recorded on the recording medium includes a content identifier for identifying the designated piece of content, and the judgment unit includes:

a contract information storage unit operable to prestore the content identifier and the contract information in correspondence with each other;

an identifier extraction unit operable to extract the content identifier from the composite content; and a judging unit operable to read the contract information corresponding to the extracted content identifier from the contract information storage unit, and judge whether the designated piece of content is usable based on the read contract information.

8. The content use device of claim 1, wherein the composite content recorded on the recording medium includes playback path information showing a correspondence between the designated piece of content and a preceding piece of content that is to be output immediately before the designated piece of content, and after the output unit outputs the preceding piece of content, the acquisition unit extracts the playback path information from the composite content, and acquires the designation in accordance with the extracted playback path information.

9. The content use device of claim 1, wherein the plurality of pieces of content include a plurality of pieces of angle content that are used for multi-angle switching, the acquisition unit acquires the designation of one of the plurality of pieces of angle content, the judgment unit judges whether the designated piece of angle content is usable, based on the contract information, if a group of outputtable pieces of angle content is selected according to the result of the judgment by the judgment unit and one piece of angle content is selected from the selected group, the determination unit determines the protection method corresponding to the selected piece of angle content, the decryption unit decrypts the selected piece of angle content based on the determined protection method, and the output unit outputs the decrypted piece of angle content.

10. The content use device of claim 1, wherein the plurality of pieces of content include a plurality of pieces of auxiliary content that are each made up of any of audio data and subtitle data output together with video data, the acquisition unit acquires the designation of one of the plurality of pieces of auxiliary content, the judgment unit judges whether the designated piece of auxiliary content is usable, based on the contract information, if a group of outputtable pieces of auxiliary content is selected according to the result of the judgment by the judgment unit and one piece of auxiliary content is selected from the selected group, the determination unit determines the protection method corresponding to the selected piece of auxiliary content, the decryption unit decrypts the selected piece of auxiliary content based on the determined protection method, and the output unit outputs the decrypted piece of auxiliary content.

11. A content use method used in a content use device for using composite content recorded on a recording medium, the composite content including a plurality of pieces of content that are respectively protected by a plurality of different protection methods, the content use method comprising steps of:

acquiring a designation of one of the plurality of pieces of content;

judging whether the designated piece of content is usable, based on contract information relating to use of the designated piece of content;

determining, if one of the plurality of pieces of content is selected according to a result of the judgment in the judging step, one protection method that corresponds to the selected one piece of content from among the plurality of different protection methods;

decrypting the selected one piece of content based on the determined protection method; and outputting the decrypted piece of content.

12. A computer program embodied on a non-transitory computer-readable storage medium, the computer program being used in a computer for using composite content recorded on a recording medium, the composite content including a plurality of pieces of content that are respectively protected by a plurality of different protection methods, the computer program comprising program code operable to cause the computer to perform a method comprising steps of:

acquiring a designation of one of the plurality of pieces of content;

judging whether the designated piece of content is usable, based on contract information relating to use of the designated piece of content;

determining, if one of the plurality of pieces of content is selected according to a result of the judgment in the judging step, one protection method that corresponds to the selected one piece of content from among the plurality of different protection methods;

decrypting the selected one piece of content based on the determined protection method; and outputting the decrypted piece of content.

* * * * *